United States Patent
Hofenauer et al.

(10) Patent No.: US 12,387,077 B2
(45) Date of Patent: Aug. 12, 2025

(54) ELECTRONIC LABELLING ASSEMBLY FOR A MULTI-PART CONTAINER, SYSTEM AND METHOD FOR APPLYING AN ELECTRONIC LABELLING ASSEMBLY TO A MULTI-PART CONTAINER

(71) Applicant: Schreiner Group GmbH & Co. KG, Oberschleissheim (DE)

(72) Inventors: Andreas Hofenauer, Germering (DE); Arne Rehm, Munich (DE); Conrad Clauss, Munich (DE); Melanie Achsnich, Munich (DE); Stefan Krauss, Munich (DE); Thomas Oberle, Munich (DE); Katharina Totev, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 18/267,172

(22) PCT Filed: Dec. 13, 2021

(86) PCT No.: PCT/EP2021/085449
§ 371 (c)(1),
(2) Date: Jun. 14, 2023

(87) PCT Pub. No.: WO2022/128893
PCT Pub. Date: Jun. 23, 2022

(65) Prior Publication Data
US 2024/0046059 A1 Feb. 8, 2024

(30) Foreign Application Priority Data
Dec. 15, 2020 (DE) .......... 102020133546.6

(51) Int. Cl.
*G06K 19/07* (2006.01)
*G06K 7/10* (2006.01)
*G06K 19/077* (2006.01)

(52) U.S. Cl.
CPC ..... *G06K 19/0723* (2013.01); *G06K 7/10297* (2013.01); *G06K 19/0776* (2013.01)

(58) Field of Classification Search
CPC .......... G06K 19/0723; G06K 7/10297; G06K 19/0776; G06K 19/07758
See application file for complete search history.

(56) References Cited

U.S. PATENT DOCUMENTS

| 5,078,679 A | 1/1992 | Reese |
| 10,872,287 B2 | 12/2020 | Giovannini et al. |

(Continued)

FOREIGN PATENT DOCUMENTS

| DE | 10 2012 112 297 A1 | 6/2014 |
| DE | 10 2019 103 878 A1 | 6/2020 |

(Continued)

OTHER PUBLICATIONS

German Search Report dated Aug. 30, 2023 in German Application No. 10 2022 131 253.4, with English translation of the relevant parts.

(Continued)

*Primary Examiner* — Sonji N Johnson
(74) *Attorney, Agent, or Firm* — Collard & Roe, P.C.

(57) ABSTRACT

An electronic labelling assembly for a multi-part container includes a sleeve-shaped supplementary element which includes a coupling structure and which is configured to be coupled with respect to a longitudinal axis of the supplementary element by the coupling structure to an outer surface of a primary closure of the container and to surround the primary closure. The labelling assembly further includes (Continued)

Figure 1:
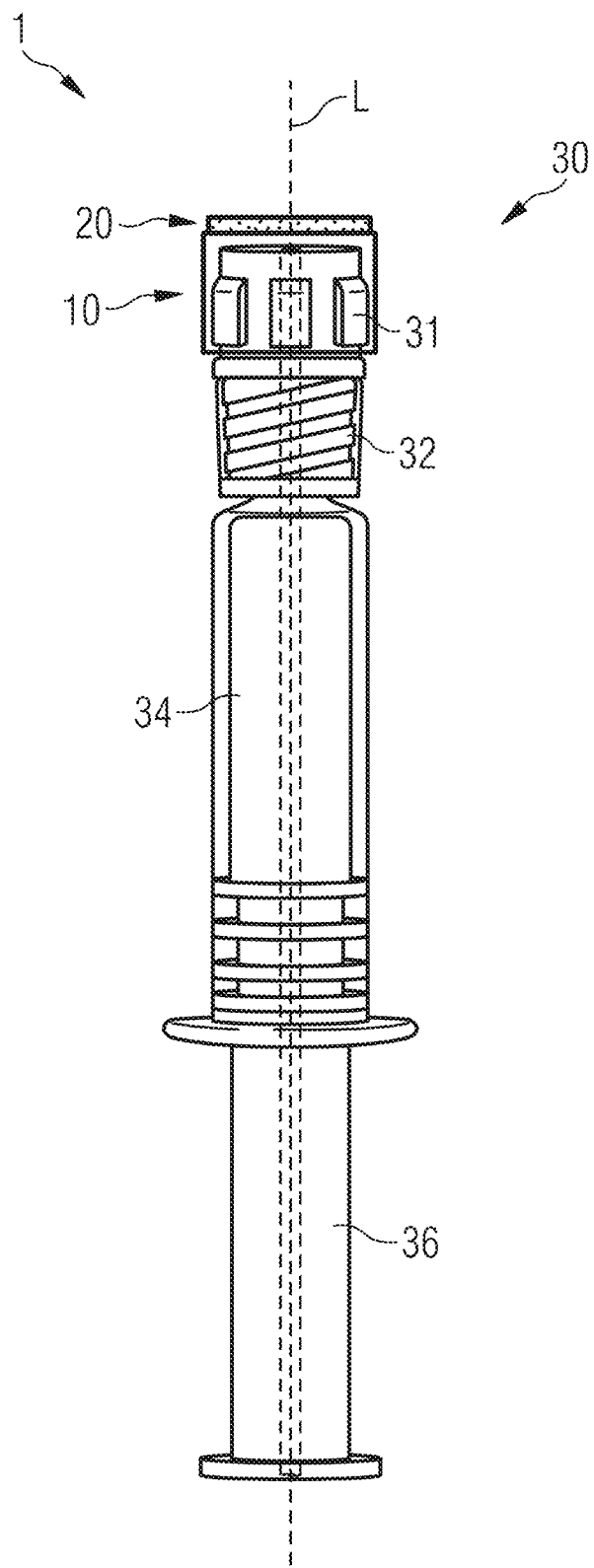

an RFID functional unit having an RFID chip and an antenna structure coupled thereto. The supplementary element and the RFID functional unit are formed in coordination with each other and coupled to each other so that the RFID functional unit is attachable to the primary closure of the container by the supplementary element.

23 Claims, 23 Drawing Sheets

(56) References Cited

U.S. PATENT DOCUMENTS

| | | | |
|---|---|---|---|
| 11,981,484 B2 * | 5/2024 | Hofenauer | B65D 51/18 |
| 2015/0090625 A1 | 4/2015 | Bauss | |
| 2016/0026911 A1 | 1/2016 | Morris et al. | |
| 2016/0144132 A1 * | 5/2016 | Scanlon | A61M 5/3202 604/192 |
| 2019/0217018 A1 | 7/2019 | Bauss et al. | |
| 2020/0202690 A1 * | 6/2020 | Shinohara | G06K 19/0716 |
| 2020/0345584 A1 | 11/2020 | Bochenko | |
| 2021/0236736 A1 * | 8/2021 | Murray | A61M 5/3134 |
| 2021/0236744 A1 * | 8/2021 | Murray | A61M 5/3134 |
| 2022/0081176 A1 | 3/2022 | Hofenauer et al. | |
| 2022/0180143 A1 | 6/2022 | Rehm | |
| 2023/0169295 A1 * | 6/2023 | Leibbrand | G06K 19/0723 235/492 |

FOREIGN PATENT DOCUMENTS

| | | | |
|---|---|---|---|
| DE | 10 2019 108 253 A1 | 10/2020 | |
| EP | 0 123 164 A1 | 10/1984 | |
| EP | 3 760 254 A1 | 1/2021 | |
| WO | WO-2013167701 A1 * | 11/2013 | B65D 23/08 |
| WO | 2018/067 929 A1 | 4/2018 | |
| WO | 2022/094382 A1 | 5/2022 | |

OTHER PUBLICATIONS

German Search Report in DE 10 2020 133 546.6 dated May 14, 2021, with English translation of relevant parts.
International Search Report in PCT/EP2021/085449, mailed Apr. 4, 2022, with an English translation thereof.
International Search Report and Written Opinion of the International Searching Authority in PCT/EP2023/078478 dated Jan. 19, 2024 with English translation.

* cited by examiner

ELECTRONIC LABELLING ASSEMBLY FOR A MULTI-PART CONTAINER, SYSTEM AND METHOD FOR APPLYING AN ELECTRONIC LABELLING ASSEMBLY TO A MULTI-PART CONTAINER

CROSS REFERENCE TO RELATED APPLICATIONS

This application is the National Stage of PCT/EP2021/085449 filed on Dec. 13, 2021, which claims priority under 35 U.S.C. § 119 of German Application No. 10 2020 133 546.6 filed on Dec. 15, 2020, the disclosure of which is incorporated by reference. The international application under PCT article 21(2) was not published in English.

The present invention relates to an electronic labelling assembly that provides reliable labelling for a pharmaceutical container in a simple and cost-effective manner. The invention also relates to a use of such an electronic labelling assembly for a multi-part container, and to a system comprising such a labelling assembly. The invention further relates to a method of applying such an electronic labelling assembly to a multi-part container.

Labelling arrangements typically comprise a label which can be used for authorisation as well as authentication or proof of origin. In particular, such labelling arrangements are used to provide information about a content or for traceability, or when it is necessary to protect ingredients against unauthorised access. This concerns, among other things, containers in the pharmaceutical and medical fields, the contents of which are to be labelled and protected.

It is an objective underlying the invention to contribute to reliable and convenient labelling of a container in a simple and cost-effective manner.

The objective is solved by the features of the independent patent claims. Advantageous embodiments are indicated in the respective dependent patent claims.

According to an aspect of the invention, an electronic labelling assembly for a multi-part container comprises a sleeve-shaped supplementary element which comprises a coupling structure and which is configured to be coupled, with respect to a longitudinal axis of the supplementary element or of the container, by means of the coupling structure to an outer surface of a primary closure for the container and to surround the primary closure. The labelling assembly further comprises an RFID functional unit comprising an RFID chip and an antenna structure coupled thereto. The supplementary element and the RFID functional unit are formed in coordination with each other and coupled to each other so that the RFID functional unit is attachable to the primary closure for the container by means of the supplementary element. In particular, the supplementary element and the RFID functional unit are designed and coupled to one another in such a way that, in an applied state of the labelling assembly on the container, the RFID functional unit extends only in the region of the supplementary element or of the primary closure of the container.

By means of the described labelling assembly, among other things, a reliable and cost-effective RFID functionalisation of syringes can be realized. The labelling assembly enables reliable and convenient electronic identification of a container in a simple and cost-effective manner, even on a very limited area of the container closure. The electronic labelling assembly is particularly suitable for Luer-Lock syringes and needle-locked syringes, so-called "staked in needle" syringes, which each have only a small labelling area on their respective primary closure. In addition, the labelling assembly described is also suitable for other primary packaging or containers in the pharmaceutical field, such as injection vials or vials.

According to an embodiment of the labelling assembly, the coupling structure comprises, with respect to the longitudinal axis, on an inner surface, a toothed structure with one or more horizontal and/or vertical toothed elements which are predefined in coordination with the outer surface of the primary closure. The supplementary element is formed, for example, as a circumferentially closed sleeve that can be slipped onto the primary closure. Alternatively, the supplementary element can be slotted on one side wall. Insofar as the primary closure has, for example, horizontally and/or vertically aligned recesses or grooves, it is expedient for the supplementary element to have a toothed structure with correspondingly protruding horizontal and/or vertical regions which can engage in the grooves. Alternatively, the coupling structure may merely denote a surface structure on an inner side of the supplementary element which can establish a reliable coupling contact with the outer surface of the primary closure. The supplementary element is, for example, slipped or pushed onto the primary closure so that, at least in sections, direct contact is made with the outer surface of the primary closure, which already establishes a reliable coupling in the form of an interference fit.

The supplementary element can, in particular, have an interlocking structure with a latching hook which is designed to form a circumferential positive coupling with the primary closure of the container so that a holding force can be set up between the supplementary element and the primary closure in the direction of the longitudinal axis. The supplementary element is then interlocked with the primary closure by turning or pushing it on until the interlocking element or elements engage in a surface structure on the primary closure. Alternatively or in addition to the interlocking structure, the supplementary element can be connected to the primary closure by means of gluing and/or welding.

In particular, the supplementary element is configured such that the supplementary element has a circumferential contour on an inner surface with respect to the longitudinal axis, which contour partially or completely replicates a negative shape to a circumferential contour on a respective outer surface of the primary closure. The supplementary element has, for example, on its inner surface a contour with the toothed structure which is predefined in coordination with a contour on the outer surface of the primary closure. By means of such an inverse shaping of the inner contour of the supplementary element, a particularly reliable hold on the primary closure of the container can be established. The supplementary element forms a form-fitting cap which realizes a geometry compensation in relation to the primary closure and can also be applied subsequently to already existing syringes or other containers in order to provide them with a space-saving electronic identification.

The described coupling or interlocking structure can contribute to a reliable hold of the supplementary element on the primary closure as well as to an easier opening of the container by means of a rotary and/or pulling movement. As an alternative to a latching hook, a toothed element of a toothed structure can be designed in the shape of a web or pin in relation to the longitudinal axis and can establish a positive coupling with the primary closure, so that a holding force is established in the radial direction about the longitudinal axis between the supplementary element and the primary closure in relation to the longitudinal axis. A transmission of force is initiated when an associated container is opened in each case due to the torsionally and/or tensionally rigid form closure between the supplementary element and the primary closure. When opening the container, the holding force of the primary closure on the container body must then be overcome by means of turning and/or pulling.

The supplementary element forms, for example, a sleeve which is open at the top in relation to the longitudinal axis and can be slipped onto the primary closure. Alternatively, the supplementary element can also be closed on a top side and have a cover element or an end wall which forms a separate element or which is formed as a section of the supplementary element integral with a side wall. The supplementary element is in particular rotationally symmetrical, for example cylindrical or conical, with respect to the longitudinal axis of the supplementary element, which in a state arranged on the container also corresponds to the longitudinal axis of the primary closure and the container.

According to an embodiment of the labelling assembly, the supplementary element comprises a first and a second part element with respect to the longitudinal axis and a separation area formed there between, so that when the container applied with the labelling assembly is opened, the supplementary element is severable in the separation area and the first part element together with the primary closure or a part thereof is removable from the second part element and a container body of the container. When the container is opened, the first part element is then pressed against an outer surface of the primary closure and separated from the second part element by pulling and/or twisting and pulled or twisted upwards together with the primary closure or a part thereof and removed from the container body.

In the context of this description, terms such as "top" and "bottom" as well as "inside" and "outside" refer to an operational arrangement or application of the labelling assembly and the container. This also applies to terms such as "head" and "body", whereby the head is usually to be arranged at the top and the body usually at the bottom. The primary closure of the container forms, for example, an upper part of an injection vial or syringe, and comprises, for example, following a Luer-lock syringe, a head part and a threaded part which can be screwed together. The head portion is unscrewed and removed from the threaded portion to open the container. The body of the container forms a lower portion of the injection vial or syringe and realizes a vessel for holding and storing a predetermined content.

The separation area of the supplementary element may be predetermined as a boundary area between the two part elements, which are formed as two separate parts of the supplementary element and which are coupled together when the labelling assembly is attached to the container. Alternatively, the part elements can also be connected to each other or formed in one piece and realize a coherent supplementary element which is placed on the container. The separation area can then also be referred to as the severing area, as it enables the cohesive supplementary element to be severed in a targeted manner.

The part elements of the supplementary element can be connected, for example, by means of retaining webs or connecting webs, so that when the container applied with the labelling assembly is opened, the supplementary element can be cut through in a predetermined manner in the separation area and the first part element can be removed from the second part element by breaking such connecting webs. Alternatively or additionally, the partial elements of the supplementary element can be connected to each other by means of the RFID functional unit, which, for example, adhesively connects the two part elements in the form of an RFID label on an outer side of the supplementary element. Thus, in addition to convenient electronic labelling of the container by means of the labelling assembly described, protection against tampering can be set up in each case, which prevents tampering with the primary closure or at least indicates such tampering in a recognisable manner. Manipulation or an attempted opening will then lead to a clearly visible breaking of the connecting webs and/or tearing of the RFID label.

If the applied supplementary element and/or the RFID label has a separation or severing area and is connected to the primary closure and/or the supplementary element by means of adhesive, an adhesive-free area is preferably formed in the separation area. This makes it easier to separate the part elements of the supplementary element or to cut through the RFID label and remove the respective upper sections. The force required to separate the supplementary element and/or the RFID label is reduced in comparison to fully bonded components, and the opening dynamics of the container applied with the labelling assembly are improved.

According to a further embodiment of the labelling assembly, a respective separation area of the supplementary element is formed in coordination with the container in an area which, in an applied state of the labelling assembly on the container, is associated with a transition between a head part and an adjacent body part of the container. Thus, a sufficiently forceful turning and/or pulling of the supplementary element simultaneously results in a predetermined separation of the labelling assembly. However, the separation area can also be arranged in other areas that enable separation of the supplementary element and/or the RFID functional unit when the container is opened.

Alternatively or additionally, the RFID functional unit, in particular in the form of an RFID label, can also have a separation area which is arranged between two label sections, so that, when the container applied with the labelling assembly is opened, the RFID label can be cut through in its separation area in a predetermined manner and a first label section together with the supplementary element or a part element thereof and the head part of the primary closure can be removed from a second label section remaining on the container and the container body.

A severing element, for example in the form of a perforation or a tear strip, can also be provided in the respective separation area, which enables controlled severing of the respective components. By means of a tear strip, the RFID label or the RFID functional unit can be specifically severed when the container is opened. Thus, a controlled severing along a predetermined perforation or along the tear strip can also be carried out in a simple and cost-effective manner.

A perforation can in particular also be combined with punch-outs or branches upwards and/or downwards, for example in order to leave clearly visible damage after the RFID label has been cut through and the container opened. For example, the perforation may be jagged to clearly indicate an initial opening. Alternatively or additionally, the RFID label or supplementary element may comprise a film or foil element in the separation or severing area that has a predetermined tear resistance.

According to a further embodiment of the labelling assembly, the supplementary element comprises a recess extending into or through a wall of the supplementary element and providing a channel for fluid exchange between an interior and an exterior of the supplementary element. Such a recess or opening allows gas or liquid to enter and exit, which is useful, for example, during a sterilization process between an interior and an exterior of the supplementary element. This is advantageous, for example, for pre-filled syringes that are sterilized with steam or ethylene oxide (ETO) gas, so that the sterilization medium can pass through the recess of the supplementary element to the primary closure.

Such a fluid opening may, for example, be provided in a side wall and/or an end wall in the supplementary element and allow an exchange of media. Preferably, a plurality of such fluid openings are provided to allow gas and/or liquid to pass therethrough. In addition, a penetrating recess may ventilate a space between the primary closure and the attached supplementary element and help to ensure that any undesirable media entrapment in the space does not adversely affect the container and its contents.

The supplementary element may be made of a material that allows it to be seen through, thus allowing visual inspection of the primary closure. For example, the supplementary element is formed from a transparent plastic. This could be particularly useful in a lower area of the supplementary element, which for example encloses a threaded element of a Luer-lock syringe. This makes it possible to inspect the syringe tip from the outside, for example to check whether air bubbles have collected in a vessel neck. The supplementary element preferably has plastic, such as polypropylene (PP), polyethylene terephthalate (PET), polycarbonate, cycloolefin polymers (COC) or cycloolefin copolymers (COP).

Preferably, an outer surface of the supplementary element is predefined roughened and/or has a microstructure that contributes to a particularly reliable adhesion of the RFID functional unit. For example, an outer surface of the supplementary element is designed to be adapted for the adhesion of an RFID label equipped with pressure-sensitive adhesive. This can be achieved by choosing a plastic with a high surface energy and/or roughness of the surface. The outer surface of the supplementary element can, for example, also have a corrugation which, as a grip structure for carrying out an opening rotary movement, enables easy-grip handling. The RFID label may also provide some roughness or grip and contribute to an improved feel of the container provided with the labelling assembly. Beneficial surface characteristics may be provided.

Preferably, the labelling assembly comprises an adhesive layer disposed on an underside of the RFID functional unit. The RFID functional unit comprises the RFID chip and the antenna structure coupled thereto, which enable information to be read electronically. In combination with a functional carrier, such as a carrier foil, the RFID functional unit can realize an RFID transponder or RFID tag, which can form a so-called "softag" as a bendable component. In combination with a component that cannot be substantially bent, an RFID tag can realize a so-called "hard tag".

Particularly preferably, the RFID functional unit is implemented as an RFID tag and has a carrier layer with an adhesive layer, so that the RFID tag can be easily and reliably arranged on the primary closure and/or the supplementary element by means of adhesive. Insofar as the RFID label has a specifically predetermined cut-through area, an adhesive-free area is preferably formed in this area. This makes it easier to cut the RFID label.

The RFID label can have a single layer or multiple layers. For example, it realizes an all-round or over-all-round label which encloses a circumference of the primary closure with respect to the longitudinal axis of the primary closure. Alternatively, the RFID label can be designed in such a way that it only partially covers the circumference of the container or the primary closure. In terms of a height or length, the RFID label may partially or completely cover the primary closure from bottom to top. Further, the RFID label may extend from a base end of the container body to a top end of the primary closure.

According to an embodiment of the labelling assembly, the supplementary element comprises a side wall and an end wall with respect to the longitudinal axis, and the RFID functional unit is arranged on or in the side wall and/or the end wall. For example, the RFID functional unit may be embedded in the supplementary element and/or arranged on an inner surface of the supplementary element, such that in an applied state of the labelling assembly, the RFID functional unit is arranged on the container between an outer surface of the supplementary element and the primary closure of the container. Thus, the RFID functional unit is securely and stably installed against external influences and can provide a particularly reliable and tamper-proof electronic labelling.

The RFID functional unit may alternatively also comprise a carrier element or a label by means of which the RFID functional unit is arranged on the supplementary element. In particular, the RFID functional unit may comprise a label with a reusable adhesive layer by means of which the label can be attached to the supplementary element and removed again at least in sections. The reusable adhesive layer is preferably based on a reusable adhesive layer, so that a label section can be adhered to the supplementary element, detached again and adhered again. Alternatively or additionally, a reusable coupling between the RFID functional unit and the supplementary element can be established by means of electrostatic adhesion. Thus, a label section can be detached from the supplementary element or the primary closure and can form a label flag which can provide a particularly useful readability of the RFID functional unit. In particular, the antenna structure is then preferably arranged in the detachable and retractable label portion for improved electronic readability.

Alternatively or additionally, the RFID functional unit is formed as a multi-layer RFID label, for example as a label booklet, and has at least one foldable and re-foldable section, so that a label flag projecting from the remaining RFID label can be formed.

Furthermore, according to a further preferred embodiment of the labelling assembly, an opening detection element can be provided, which is arranged in a separation region of the supplementary element and/or a separation region of the RFID functional unit and is designed to indicate an opening of the container applied with the labelling assembly. In particular, a removal of at least one part element of the supplementary element and/or the RFID functional unit from the container can thus be indicated. If, for example, the supplementary element has part elements and connecting webs which connect the upper, first part element to the lower, second part element, the connecting webs break open when the container is opened by pulling and/or turning the primary closure which is fitted. Such broken connecting webs form a proof of opening and visibly indicate that an opening has at least partially taken place.

Alternatively or additionally, a severed or torn label section and/or a severed or torn conductive path of the RFID functional unit can form a secure proof of opening. The RFID chip can thus detect an opening attempt in the form of a change in electrical conductivity and/or signal strength, thereby providing an electronic opening detection element in the form of the specially formed conductor track. Such an opening attempt can be stored in the RFID chip and read out when required. Alternatively or additionally, a severed or torn part of the antenna structure of the RFID functional unit can form a secure opening detection element. The RFID functional unit can then either no longer be read at all or only with a significantly reduced reading range, which clearly indicates an initial opening.

Alternatively to the labelling assembly with the supplementary element, a labelling assembly without a supplementary element can also be provided, which has the RFID functional unit directly coupled or couplable to a primary closure. Accordingly, the primary closure and the RFID functional unit are specifically designed to match each other, so that a reliable coupling can be formed between these elements and, in addition, an advantageous electronic identification of the container provided with the primary closure can be set up.

Preferably, analogous to the supplementary element described above, an outer surface of the primary closure is predefined roughened and/or has a microstructure which leads to a particularly reliable adhesion of the RFID functional unit. For example, an outer surface of a cap element and/or threaded element for a Luer-lock syringe or a needle protection cap for a needle-secured syringe is designed to be adapted for the adhesion of an RFID label equipped with pressure-sensitive adhesive. This can be achieved by choosing a plastic material with a high surface energy and/or roughness of the surface for the respective primary closure. The outer surface of the primary closure may also be divided in two, with one section adapted to be bonded or arranged with the RFID label. The RFID functional unit can also be integrated into the primary closure during its formation and, for example, embedded in the respective closure element as part of an injection molding process.

Furthermore, features and characteristics described in connection with the labelling assembly with a supplementary element may also apply to the labelling assembly without a supplementary element, provided that they are not necessarily associated with the supplementary element. Thus, for example, properties and features that relate to a surface finish or a surface structure of the supplementary element can also relate to designs of the surface finish or the surface structure of the primary closure.

Thus, the RFID functional unit may further comprise, for example, an opening detection element, in the form of separable label sections and/or conductive track sections, arranged in the separation area of the RFID label and adapted to indicate an opening or attempted opening of the container applied with the labelling assembly. The RFID label and/or the specifically predefined electrical conductor track extend over a predefined separation area of the primary closure, so that a separated label section and/or conductor track section implements such an opening detection element. After the container has been opened, a ruptured conductive path section or a torn perforation as well as a label section of the RFID label, for example, remain on an element of the primary closure. In connection with the electrical conductor path, an electronic opening detection element can thus be realized, the state of which can be stored and read in the RFID chip.

The conductive track or a conductive track section may form part of the antenna structure or be provided in addition thereto. Accordingly, the described severable conductor track as part of the antenna structure can lead to the antenna structure being destroyed in a predetermined manner when such a labelled syringe is opened, so that an opening that has taken place can be clearly detected by means of an electronic readout that is no longer possible. Thus, the antenna structure can be specifically designed in such a way that an initial opening protection or an initial opening indication is set up by a destruction of the antenna structure.

Furthermore, the primary closure or a part thereof may be selectively elongated so that improved readability of labelled syringes arranged in a plurality in a syringe holder, such as a syringe tray or a syringe nest, is achievable.

In particular, the RFID functional unit may also have the previously described special antenna structures and/or dimensions in order to provide reliable and convenient electronic labelling even for the usually very small radii and surfaces of syringe closures.

Thus, even by means of the labelling assembly without a supplementary element, reliable and secure labelling of the container can be achieved, which also counteracts unauthorized manipulation of the container contents and can clearly indicate and electronically read an initial use or an initial opening that has already taken place. The RFID functional unit can in particular have an identifying medium with an imprint or inscription as an RFID label. In addition, the RFID label can contribute to a reliable hold of a primary closure by connecting it to the vessel body by means of the RFID label.

According to a preferred embodiment of the labelling assembly, a length and a width of the antenna structure of the RFID functional unit and a perimeter of the supplementary element on an outer surface are formed in coordination with each other with respect to the longitudinal axis. Alternatively or additionally, a length and a width of the antenna structure of the RFID functional unit and an end wall surface of the supplementary element at the upper side and the end wall, respectively, may be formed in coordination with each other with respect to the longitudinal axis. In particular, the antenna structure and the supplementary element are designed to match conventional syringes, so that the antenna structure preferably has a rectangular shape with a length of at least 20 mm and a width of at least 2 mm relative to the longitudinal axis. Alternatively, the antenna structure can also be rectangular in shape in such a way that it is spirally wrapped around the element provided for this purpose.

By means of such adaptations of the interacting components, a particularly advantageous radiation characteristic of the RFID functional unit can be provided for reading by a reader. If, for example, the rectangular antenna structure described above is attached to the side wall of the supplementary element and wrapped around the outer surface, the resulting radiation characteristic has a doughnut shape, with maxima of the radiation set up in the axial direction along the longitudinal axis. Thus, despite the small dimensions, RFID functionality can be provided on a syringe, which has a reading range of 15 cm up to 40 cm or more. Accordingly, a large number of labelled syringes stored upside down in a syringe tube can be read reliably and in a time-saving manner at once. Furthermore, such a rectangular antenna structure may also be provided for attachment to the top or end wall of the supplementary element.

Alternatively, the antenna structure can have a circular and meandering structure for attachment to the top side or the end wall of the supplementary element. Furthermore, such an antenna structure may also be arranged on a side wall of the supplementary element and provide an advantageous radiation pattern for readout. For example, such an antenna structure has an antenna length of 80-100 mm due to the intertwined loop shape. Arranged on the end wall, such an antenna structure again provides a doughnut-shaped radiation characteristic with maxima which extend predominantly transversely to the axial direction or transversely to the longitudinal axis of the labelled syringe, but also radiate sufficiently in the axial direction along the longitudinal axis. Thus, despite the small dimensions on the front wall of the syringe, RFID functionality can be provided which achieves a reading range in the axial direction of up to 6 cm and laterally or transversely to the axial direction of 15 cm up to 25 cm or more.

Such a relatively long lateral scanning range can be further advantageous with respect to a storage of a plurality of labelled syringes in a syringe tray or a syringe tube, in that they are usually arranged next to each other and mutually support each other in their excitation for reading. This again enables reliable detection and reading of a large number of such labelled syringes.

The antenna structures described can accordingly also be provided for attachment directly to a primary closure, so that the antenna structure can be designed to match one another, in particular with regard to its length and its width, and a circumference and/or a surface of the primary closure intended for attachment. Thus, the antenna structures and their radiation characteristics, which are advantageous despite their relatively small dimensions, are also suitable for labelling assemblies without a separate supplementary element.

In particular, the special design of the antenna structure makes the best possible use of the area available for it, whereby the geometries of the supplementary element and/or the primary closures can be designed in a specifically coordinated manner. It is a finding in connection with the present invention that a classical dipole antenna with typical dimensions in the range of half the wavelength cannot be used due to the limited space available, or at least do not provide radiation characteristics that can be used for the applications described.

If, for example, the RFID functional unit in the form of an RFID label is attached to a respective top side, a round RFID antenna structure is preferably applied to a corresponding end wall for reasons of shape. In order for the antenna to obtain the appropriate resonance frequency with the small dimensions, the antenna structure is designed as a "loop". Such a loop can be intertwined or nested and thus a total loop length can be achieved, which is again in a range of half the wavelength of the readout field. Thus, by means of the antenna structure, despite its relatively small external dimensions, an advantageous tuning to the frequency of the reader can be set up, which has a useful performance for information retrieval and information transmission. The antenna structure is therefore preferably designed to be tuned to an intended reading device for reading with regard to its radiation characteristic and a reading range.

The RFID functional unit can also be mounted on a side surface of the supplementary element or the primary closures in the form of an RFID tag. Thus, there are further realization possibilities of a beneficial performance despite small dimensions. According to such an embodiment, a suitable antenna structure can be wrapped around a preferably round section of the supplementary element or the primary closure. This results in completely different radiation characteristics compared to the flat, non-wound antenna structure, which favour a readout, in particular also of several syringes simultaneously.

With regard to a relatively simple design of the antenna structure with a rectangular conductor loop, this is wound around the syringe body, the end structure of the syringe or the supplementary element so that, due to the magnetic field distributions, a radiation characteristic results which is mainly oriented in the axial direction. Due to this directional radiation of the RFID functional unit, very advantageous ranges can be realized with a small size.

If the RFID functional unit is also designed in such a way that a section can be detached as a flag, this can contribute to an even better reading range for information transmission. For example, the RFID functional unit is applied to the syringe body, the syringe closure or the supplementary element as an RFID tag or RFID label, so that the antenna structure can be at least partially detached from the corresponding element via a grip tab. In this way, significantly increased reading ranges can be realized, which enable application scenarios that go beyond tracking and tracing. According to such embodiments, the labelling assembly preferably comprises elements and/or structures that allow for a stable and reliable formation of such an antenna or label flag, so that it remains in the unfolded position. By means of such an unfolded antenna flag, reading ranges of more than 2 m can be achieved, so that such labelled syringes can be electronically detected in a particularly convenient and reliable manner.

According to a further aspect, the invention comprises a use of an embodiment of the described electronic labelling assembly for a container divisible into a plurality of parts comprising a container body and a primary closure.

According to a further aspect of the invention, a system comprises a primary closure coupleable to a container body of a container divisible into multiple parts. The system further comprises an embodiment of the previously described electronic labelling assembly coupled to the primary closure such that the supplementary element at least partially surrounds the primary closure. Further, the system may further comprise a container body coupled to the primary closure. The system preferably implements a Luer-lock syringe or a needle-locked syringe, wherein in the embodiment of a Luer-lock syringe a cap element and a Luer adapter and in the embodiment of a needle-locked syringe a needle protection cap set up the respective primary closure.

In that the use and the system relate to or comprise an embodiment of the labelling assembly described, the described properties and features of the labelling assembly are also disclosed for the use and for the system, and vice versa.

The labelling assembly is particularly suitable for use on a syringe, which is a multi-part container with a syringe head and a syringe body. However, the principle can also be used for other pharmaceutical packaging, such as injection vials or vials. In particular, the labelling assembly described also enables subsequent sealing or electronic labelling of pre-filled syringes. By means of the supplementary element, an adapter for the primary closure of the container can be realized, which can also set up a geometry compensation at the syringe head or between the syringe head and the syringe body. Therefore, the labelling assembly may further also contribute to a simple, automated and process-reliable labelling capability of such containers and, in particular, provide an increased surface area for the reliable attachment of the RFID functional unit. Usually, the threaded section of the primary closure is smaller than the head part or the body of the container. In the case of rotationally symmetrical containers, such as a syringe, this refers in particular to a diameter of the respective container components. Furthermore, a threaded section of a Luer-lock syringe usually has a tapered threaded section, which can only be labelled with increased effort. By means of the surrounding supplementary element, the diameter of the head area of the syringe can be enlarged in a targeted manner and, for example, provide a smoother surface or a surface that is more suitable for labelling. Thus, the RFID label can be applied particularly easily and reliably to the container adapted with the supplementary element.

According to a further aspect of the invention, a method of applying an embodiment of the electronic labelling assembly described above to a primary closure for a multipart container comprises providing the primary closure for a container divisible into a plurality of parts and couplable to a body of the container. The method further comprises providing the sleeve-shaped supplementary element comprising a coupling structure, and providing the RFID functional unit comprising an RFID chip and an antenna structure coupled thereto. The method further comprises coupling the RFID functional unit to the supplementary element and coupling the supplementary element by means of the coupling structure to an outer surface of the primary closure such that the supplementary element surrounds the primary closure and the RFID functional unit is attached to the primary closure by means of the supplementary element.

By means of the described applying or mounting method, it is possible to use the properties and features provided by the labelling assembly for a secure protection and a reliable and convenient electronic identification of the container. In that the method relates to applying or assembling an embodiment of the described electronic labelling assembly and its arrangement on the primary closure, the described properties and features of the labelling assembly are also disclosed for the method and vice versa.

According to an embodiment, the method further comprises providing the container body of the container and coupling the primary closure to the container body. In particular, the coupling of the primary closure to the container body is performed subsequent to the coupling of the supplementary element and/or the RFID functional unit to the primary closure.

The coupling of the supplementary element to the primary closure of the container may comprise forming a respective positive, frictional and/or material connection. Such couplings can be formed in particular by means of interlocking, by means of gluing, by means of welding and/or by means of the action of thermal radiation.

The electronic labelling assembly attached to the container enables reliable electronic identification, especially for Luer syringes, which can also be arranged only in the area of the primary closure. By means of the labelling assemblies described, pharmaceutical containers, in particular prefillable syringes, can be equipped with RFID functionalities in a simple and cost-effective manner and can thus be made connectable. This is of great importance, for example, for tracking and tracing or the identification of the container. Prefillable syringes, in particular their primary closures, are part of pharmaceutical approvals in terms of their design and function. Changing these structures usually involves a great deal of effort.

The labelling assembly makes it possible to integrate RFID functionalities, for example in the case of a syringe, whereby this or its primary closure does not have to be adapted, or only slightly, in terms of its shape and applicability. In particular, the labelling assembly may be designed such that a circumference of the primary closure, for example the cap element and/or Luer adapter of a Luer-lock syringe, is not or not too much enlarged during RFID integration, so that the syringes still fit into provided cavities of syringe nests or syringe tubs.

With regard to such syringe tubs or other holding systems, the supplementary element can in particular also be designed to be purposefully enlarged and in particular elongated. In this case, the supplementary element can enlarge the syringe in one or more dimensions. For example, it may be advantageous to enlarge a syringe length in a predetermined manner by means of the supplementary element and/or by means of adaptation of the primary closure, so that the RFID functional unit applied to the supplementary element and/or primary closure is located closer to a bottom of a syringe barrel in which syringes are accommodated upside down. Usually, in conventional syringe barrels, there is a distance between the syringe tip and the bottom side of the syringe barrel, which can be used specifically by means of the described syringe extension in order to enable easy and reliable reading by readers that detect and read the RFID chips of the syringes from the bottom side, even with a relatively small reading range of small RFID functional units.

With respect to conventional syringe holding and storage systems, such as a syringe barrel, there is typically a distance of 30 mm or 40 mm between a syringe head and the bottom side of the syringe barrel with respect to a Luer lock syringe placed upside down in the syringe barrel. In relation to a generally longer designed needle-locked syringe, a distance of about 15 mm is still available if the syringe is stored appropriately. The available distance can be used specifically for forming the supplementary element and/or adapting a primary closure of the tips in order to be able to place the RFID functionality closer to the bottom side of the syringe barrel and accordingly contribute to a reliable reading and transmission of information. The supplementary element and/or the respective primary closure may therefore be designed to extend an original or commercially available syringe geometry by 10 mm, 15 mm, 20 mm, 30 mm up to 40 mm.

It is a finding in connection with the present invention that a surface of closure structures and, in the case of glass syringes, also the surface of a Luer adapter are unfavourably or not usefully designed for the application of RFID tags by means of pressure sensitive adhesive. On the one hand, there are insufficiently large and flat surfaces, and on the other hand, the materials used have a surface microstructure and surface tension that are unsuitable for pressure-sensitive adhesives.

By means of the labelling assemblies described, RFID functionalizations of pharmaceutical containers can be realized which can be applied to such closure structures of prefillable syringes, preferably by means of pressure-sensitive adhesive, and which also provide sufficient RFID functionality without having to change the shape and applicability of the syringe. In particular, due to the supplementary element and/or the antenna structure and the associated size, design and positioning of the RFID functional unit, a sufficiently large read and/or write range can be made possible.

The RFID functionalization of the present invention is particularly carried out in the region of the end structures of multi-part containers which have a primary closure. The areas available in this region require a relatively small RFID functional unit, which usually limits the reading range of the RFID functionality. By a special design of the RFID functional unit according to the described labelling assembly, a sufficient reading range for the planned applications, for example in the area of track & trace in the pharmaceutical supply chain, can be set up despite a small size.

The RFID functional unit can be applied directly to currently commercially available end structures, for example in the form of an RFID tag. Especially in connection with a special antenna structure that can be wrapped around the end structure, a reliable and convenient electronic identification of syringes can already be realized. Preferably, the RFID functional unit is accordingly designed as an overlap wrap-around label and comes to rest on itself in sections, so that a secure and reliable hold on a commercially available end structure can be established. In addition, however, it is particularly useful that these end structures are designed in a predetermined form and shape for the application of such an RFID tag or are matched to one another and prepared for the application of the RFID tag. Alternatively, this can be achieved in a simple and cost-effective manner by means of the supplementary element, which can be formed in a predetermined manner adapted to the RFID functional unit to be attached or accommodated.

It is further a finding in connection with the present invention that conventional RFID solutions are based on labels which are arranged, for example, on a container body and which, however, are not designed to meet the special requirements for application exclusively in or on a closure region of a container. By means of the labelling assembly described, reliable coupling is also possible only in the closure area of syringes, which, in particular due to the design, positioning as well as possible additional functions of the supplementary element and/or the RFID functional unit, provides advantageous RFID functionality in order to implement reliable use of this technology, for example based on specific range requirements. The primary closure and/or the supplementary element are specifically designed for the adhesion of an RFID label to such a closure, whereby the RFID label does not also have to adhere to the body of the container.

Furthermore, the described embodiments of the labelling assemblies enable both prior and subsequent attachment to a primary closure of a syringe before or after it is or has been attached to the syringe body. Already existing syringes can be retrofitted with RFID functionality in a simple and cost-effective manner by means of the labelling assembly, in particular in connection with the supplementary element.

In the event that the labelling assembly is coupled to the primary closure before the syringe or container is assembled, the risk can also be eliminated that, for example, in the case of syringes with a secured syringe needle, the application of force during the subsequent application of RFID labels causes a relative movement of the needle protection cap to the syringe needle, which can damage a needle grinding and lead to undesirable particle formation. In addition, bending of the syringe needle could be a consequence during labelling due to the application of force in the closure area. In the case of syringes with a Luer adapter, there is a risk that, during labelling, force may cause the threaded part to move relative to the syringe body, which may impair sealing or sterility.

When applying RFID functionality to commercially available unmodified syringes, the distance between the RFID tag and a reader is defined by the dimensions of the syringe and the position of the syringe in a holding system, such as a syringe tray or syringe tube. Depending on the circumstances, this may be too great for an RFID chip to be read. By means of the described labelling assemblies, electronic functionalizations of syringes can be realized, which are optimized in particular for application to the limited surfaces of the syringe end structures, in order to provide a sufficient reading range for the respective application purpose despite their small size.

The designs of the labelling assemblies concentrate on the closure structures or the primary closures, so that RFID functionalization does not require simultaneous labelling of the syringe body. By combining this with a supplementary element that is provided with RFID functionality, the closure area is electronically functionalized in a simple and reliable manner without having to modify the syringe itself in this respect. In addition, it is possible to achieve relevantly larger surfaces and areas for applying the RFID functional unit, even without disturbing enlargement of the syringe dimension, whereby larger RFID antenna structures can be used and, in turn, greater reading ranges can be achieved.

Figure 2:
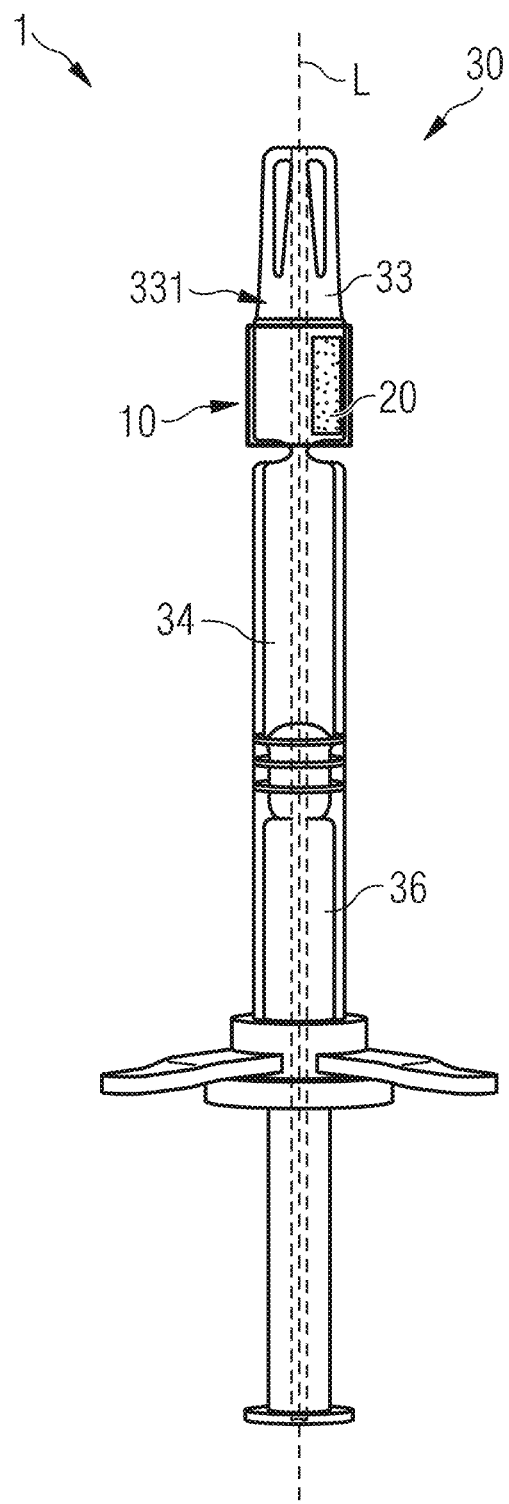
Figure 3:
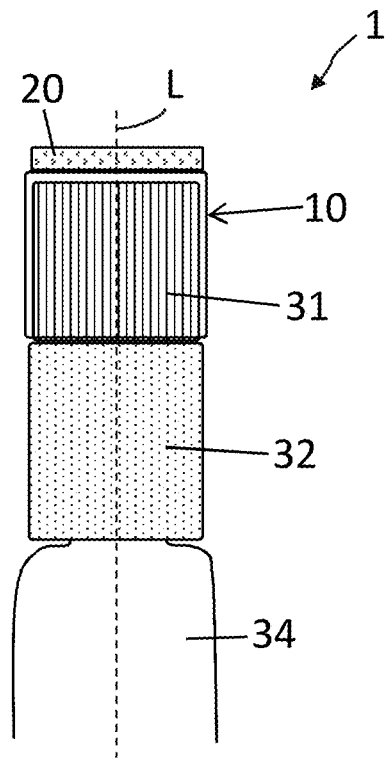
Figure 46:
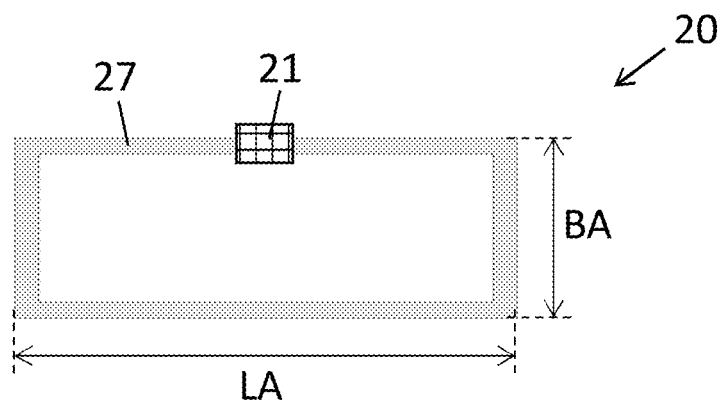
Figure 47:
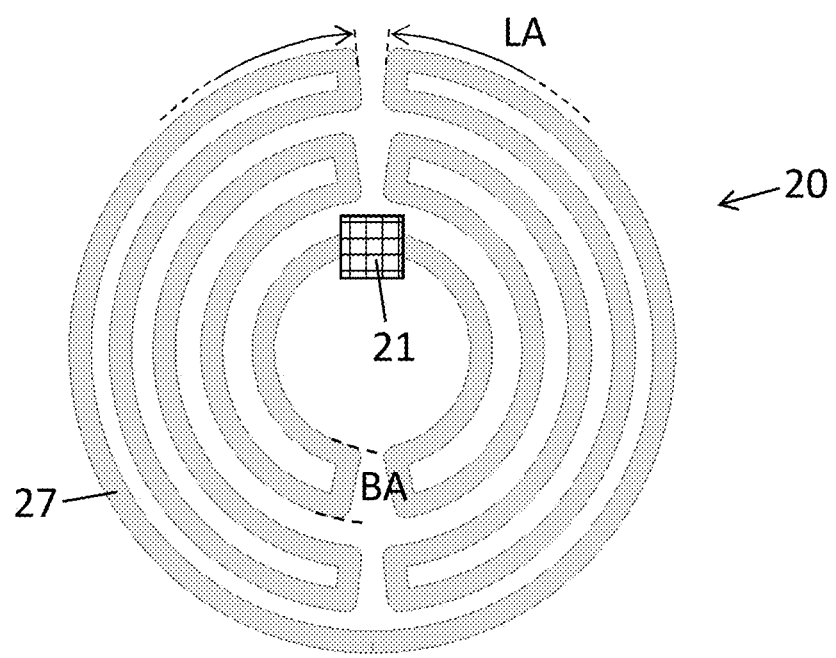
Figure 48:
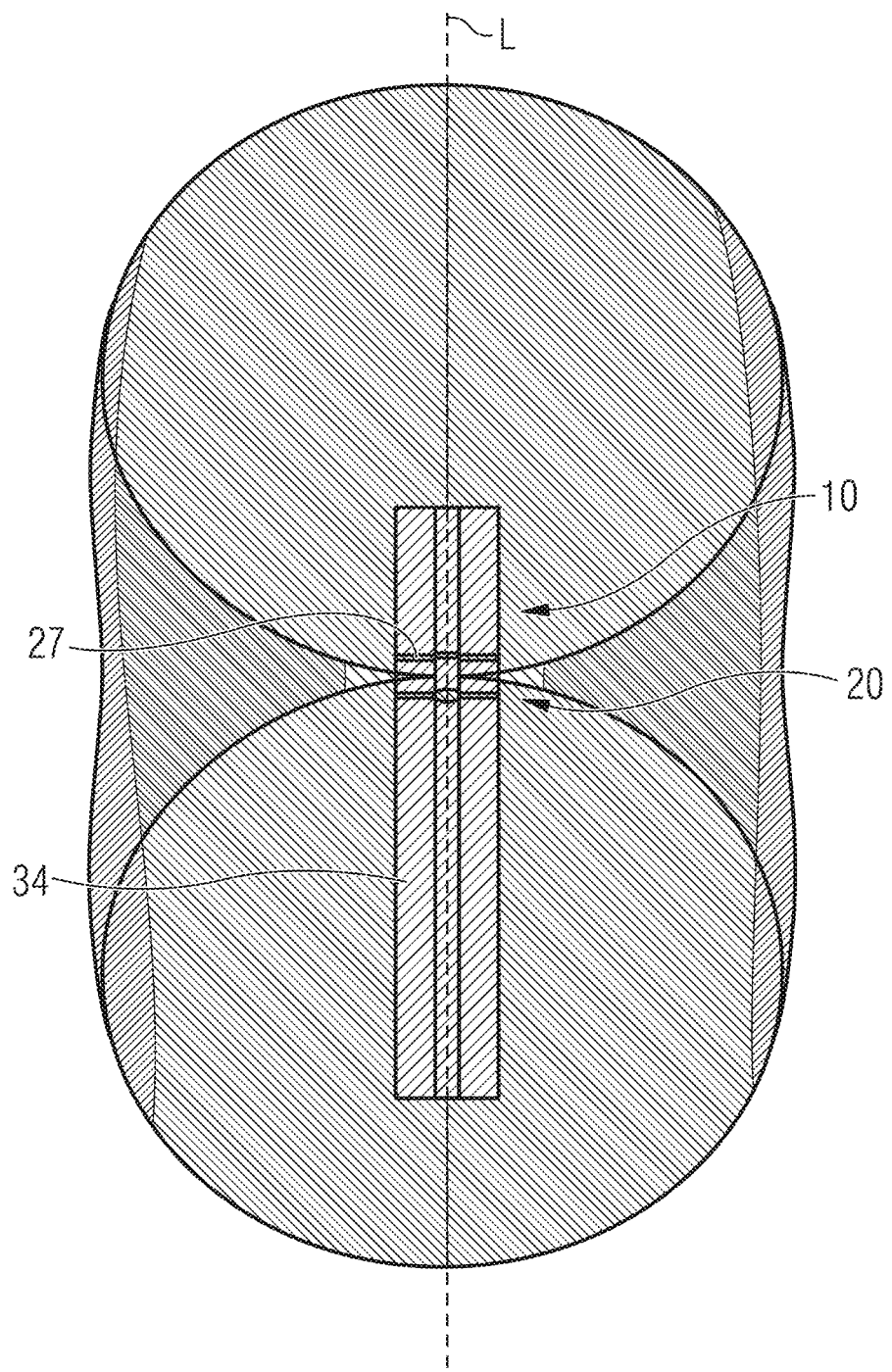
Figure 49:
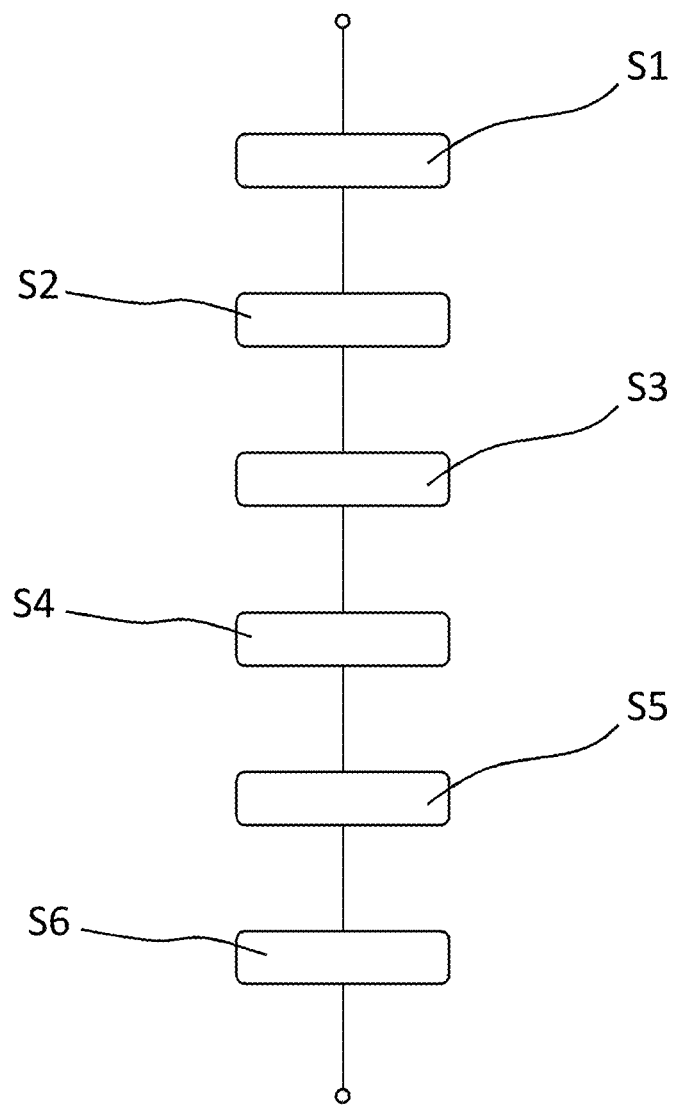

In the following, embodiments of the invention are explained with reference to schematic drawings. They show:

FIG. 1 an embodiment of a system with a Luer-lock syringe and an electronic labelling assembly attached to it, FIG. 2 an embodiment of a system with a needle-secured syringe and an electronic labelling assembly attached to it, FIGS. 3-10 various embodiments of the electronic labelling assembly on a Luer-lock syringe according to FIG. 1 or on a needle-secured syringe according to FIG. 2, FIGS. 11-24 various embodiments of a supplementary element and an RFID functional unit of the electronic labelling assembly coupled thereto, FIGS. 25-45 further embodiments of the electronic labelling assembly on a Luer-lock syringe according to FIG. 1 or on a needle-secured syringe according to FIG. 2, and FIGS. 46-47 various embodiments of an antenna structure of the RFID functional unit, FIG. 48 radiation characteristics of an antenna structure of the RFID functional unit according to FIG. 46, and FIG. 49 a flowchart of a method for applying the electronic labelling assembly to a multi-part container.

Elements of the same construction and function are marked with the same reference signs across the figures. For reasons of clarity, not all of the elements shown in all of the figures are marked with the corresponding reference signs, possibly.

FIG. 1 shows a schematic side view of a system with a multi-part container and an electronic labelling assembly 1 attached thereto. The container is designed as a Luer-lock syringe 30 and comprises a primary closure with a cap element 31 and a Luer adapter 32, which are coupled to a syringe body 34, in which a content is arranged or can be arranged, which can be expelled from the syringe body 34 by means of a syringe plunger 36 if required. With respect to a longitudinal axis L, the cap member 31 may also be referred to as the head portion of the Luer-lock syringe 30. The Luer adapter 32 may also be referred to as the threaded portion or threaded section. The cap element 31 and the Luer adapter 32 realize a head-side end structure of the Luer-lock syringe 30 as a primary closure. The electronic labelling assembly 1, which comprises a sleeve-shaped supplementary element 10 and an RFID functional unit 20, is arranged on the cap element 31.

FIG. 2 shows a schematic side view of a further system comprising a multi-part container and an electronic labelling assembly 1 attached thereto. The container is configured as a needle-secured syringe 30 and comprises a primary closure with a needle protection cap 33, which is attached to a syringe needle 37 and coupled to the syringe body 34. A content is placed or arrangeable in the syringe body 34, which can be expelled from the syringe body 34 by means of the syringe plunger 36 when required. With respect to the longitudinal axis L, the needle protection cap 33 as a primary closure realizes a head end structure of the needle-secured syringe 30. The electronic labelling assembly 1, which comprises the supplementary element 10 and the RFID functional unit 20, is arranged on the needle protection cap 31.

The following description describes possible embodiments of the labelling assembly 1 in connection with the Luer-lock syringe 30 or the needle-secured syringe 30 or generally with a syringe 30, which are also transferable to other pharmaceutical containers, such as injection vials or vials, which are of multi-part design.

The RFID functional unit 20 comprises in each case an RFID chip 21 and an antenna structure 27 coupled thereto, which enable information to be read out electronically. In combination with a functional carrier, such as a carrier foil, the RFID functional unit 20 may also be referred to as an RFID transponder or RFID tag. The RFID functional unit 20 may also be implemented as an RFID label and have, for example, a carrier layer with an adhesive layer, so that the RFID label can be easily and reliably arranged on the respective primary closure 31, 32 or 33 of the syringes 30 and/or on the supplementary element 10 by means of adhesive. In the following description, possible embodiments of the labelling assembly 1 are described, which always comprise an RFID functional unit 20, which may in particular be designed and designated as an RFID tag or as an RFID label.

Terms such as "above" and "below" as well as "inside" and "outside" refer to an operational arrangement or application of the labelling assembly 1 according to the illustrated orientations of the syringes 30 according to FIGS. 1 and 2. A head of a respective syringe is therefore arranged above and the body is usually arranged below. The primary closure 31, 32 or 33 forms a component of the respective syringe 30 as a head part, which is completely or partially unscrewed and/or pulled off and removed from the syringe body for opening the syringe.

The labelling assembly 1 comprises the RFID functional unit 20 and, according to the embodiments shown in FIGS. 1-35, the sleeve-shaped supplementary element 10. The supplementary element 10 has a coupling structure and is adapted to be coupled to and to surround an outer surface 311 and/or 321 or 331 of the respective primary closure 31, 32 or 33 with respect to a longitudinal axis L by means of the coupling structure. According to the orientations shown in the figures, the longitudinal axis L corresponds to a longitudinal axis of the supplementary element 10, a longitudinal axis of the primary closures 31, 32 and 33 and also a longitudinal axis of the respective syringes 30. The supplementary element 10 and the RFID functional unit 20 are formed in coordination and coupled to each other so that the RFID functional unit 20 is attached to the respective primary closure 31, 32 or 33 of the associated syringe 30 by means of the supplementary element 10.

Figure 26:
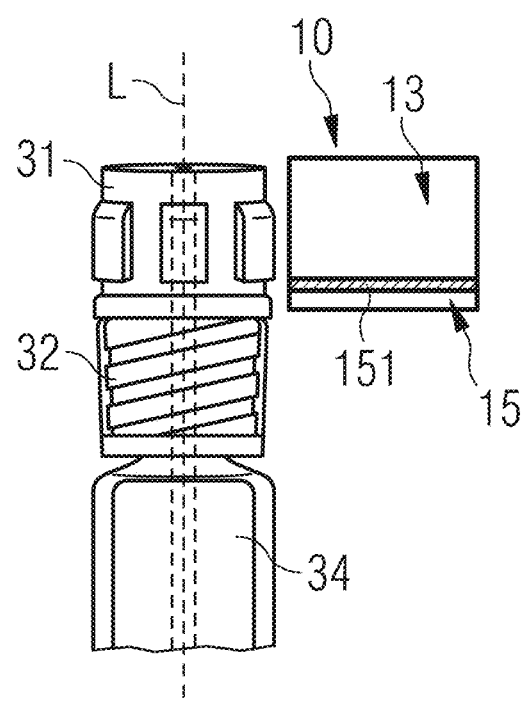
Figure 27:
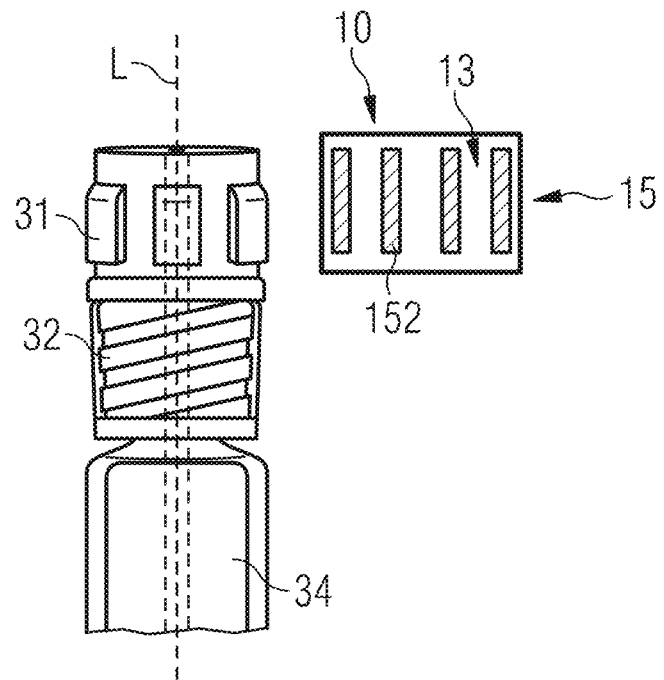
Figure 28:
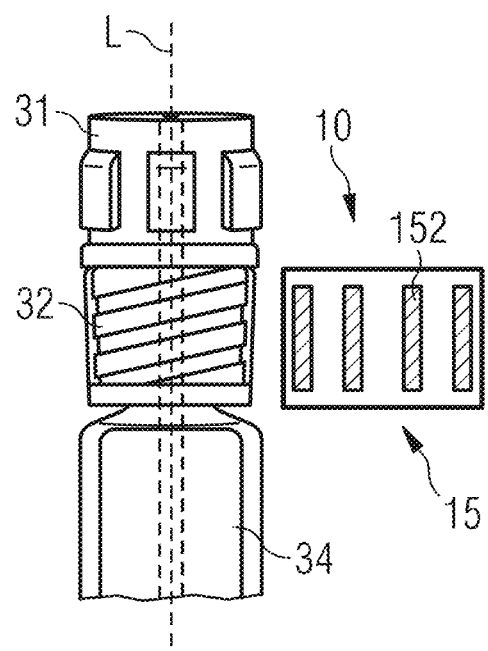
Figure 29:
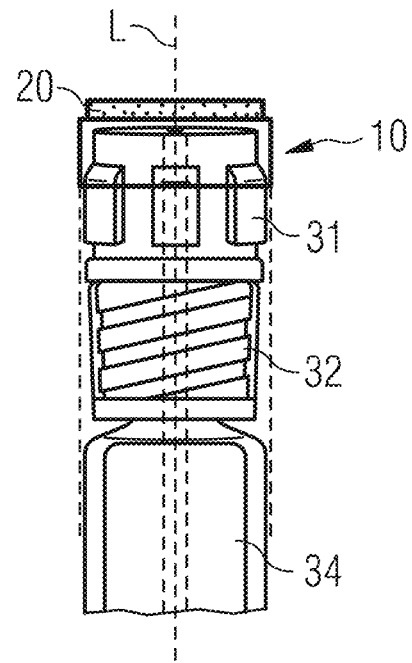
Figure 30:
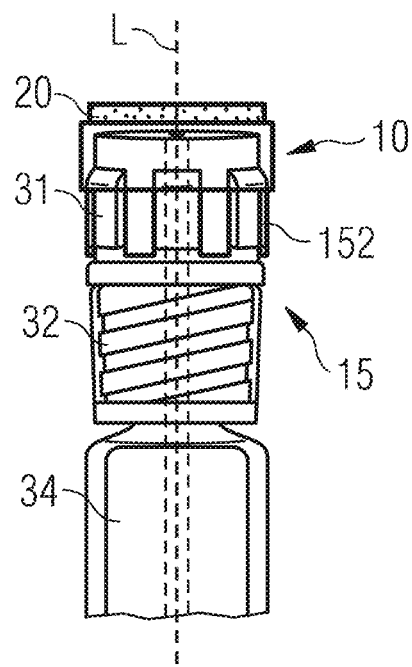
Figure 31:
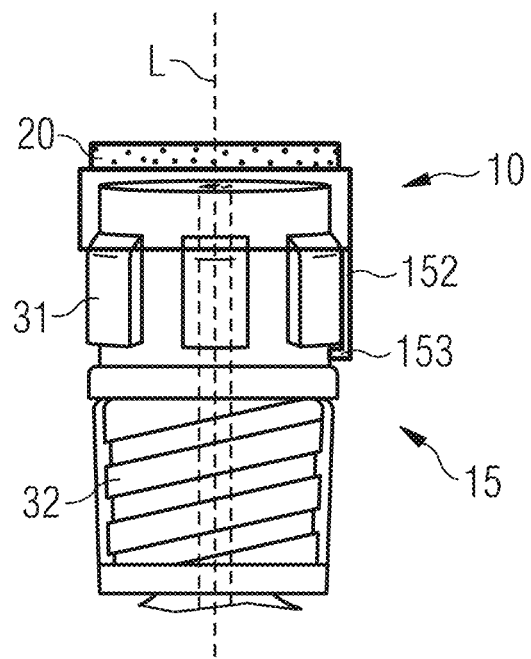
Figure 32:
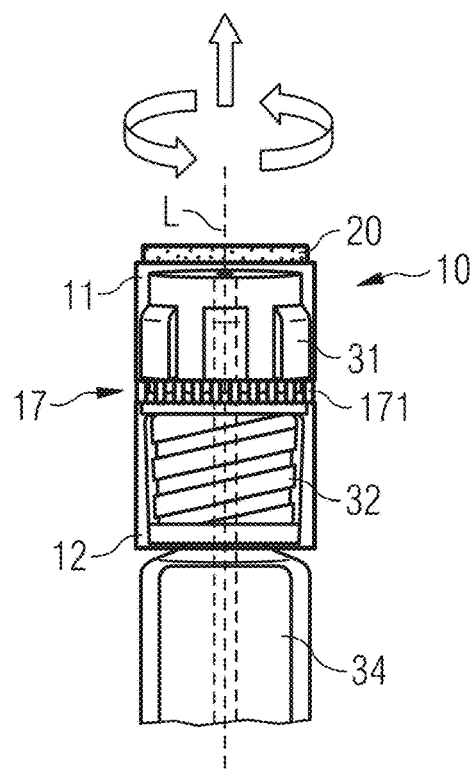

The coupling structure may form an engagement structure with coupling elements that can engage or be inserted into corresponding recesses on a respective primary closure 31, 32 or 33 (see FIGS. 27, 28 and 30). In addition, the coupling structure may also represent the surface structure on an inner side of the supplementary element 10 which is fitted or pushed onto the primary closure 31, 32, 33 and is at least partially in retaining contact with the outer surface 311 and/or 321 or 331 of the respective primary closure 31, 32 or 33 and forms an interference fit (see FIG. 29). In particular, the coupling structure comprises an coupling structure 15 having one or more interlocking elements 151, 152, 153 formed on an inner surface 13 of the supplementary element 10 and which are aligned, for example horizontally and/or vertically, with respect to the longitudinal axis L and which are preformed in coordination with the outer surface 311, 321, or 331 of the respective primary closure 31 and/or 32 or 33 (see FIGS. 26-31).

In each of FIGS. 26-28, adjacent to the syringe 30, are illustrated cut-outs from an inner surface of the supplementary element 10 which have coupling or interlocking elements 151 or 152 in the form of ridges or grooves which can engage in corresponding recesses or grooves on the cap element 31 or the Luer adapter 32.

The labelling assembly 1 preferably comprises an adhesive layer arranged on an underside of the RFID functional unit 20. The RFID functional unit 20 enables information to be read electronically by means of the RFID chip 21 and the antenna structure 27. The RFID functional unit 20 may, for example, be adhered to the supplementary element 10 by applying a hard tag or soft tag, for example as part of a label. Alternatively, the RFID functional unit 20 can already be integrated into the supplementary element 10 during its manufacture, for example by means of molding or so-called "in-mold" technologies. The RFID functional unit 20 can be arranged on or in a side wall 191 and/or on or in an end wall 192 of the supplementary element 10 (see FIGS. 11-24).

The supplementary element 10 is preferably mechanically connected to the end structure or primary closure 31, 32, 33. This is preferably done by mechanical interlocking by means of the coupling structure 15, wherein an outer structure of the primary closure 31, 32, 33 and an inner structure of the supplementary element 10 are formed to match each other (see FIGS. 26-28 and 31). According to the embodiment shown in FIG. 31, the coupling structure 15 may comprise engaging hooks 153 and ridges 152 which engage in recesses of the cap element 31 and/or the Luer adapter 32. Alternatively or additionally, an interference fit of the supplementary element 10 can be set up at or on the cap element 31 or the needle protection cap, so that the supplementary element 10 is already securely and reliably coupled to the primary closure 31, 32 or 33 due to its pressed-on state (see FIG. 29). The dashed lines in FIG. 29 are intended to indicate that the supplementary element 10 can be designed and geometrically adapted to the respective primary closure in such a way that it does not lead to an increase in the syringe geometry. For example, the widest point of the illustrated Luer-lock syringe 30 is formed by a collar in the transition area of the cap element 31 and the Luer adapter 32. The supplementary element 10 can therefore be formed in such a way that it does not increase the circumference compared to the circumferentially widest point and grip elements on the primary cap 31, 32 are not covered.

The supplementary element 10 may completely or partially cover the end structures 31, 32 or 33. It can thus completely or partially surround a section on the cap element 31, the Luer adapter 32 or the needle protection cap 33 with respect to the longitudinal axis L. In the case of partial covering, it is possible that the supplementary element 10 is placed in such a way that the end structure 31, 32, 33 is not further enlarged in its largest diameter and is thus advantageously formed with regard to the transfer of such labelled syringes 30 into nests or syringe tubs.

The supplementary element 10 is sleeve-shaped and can surround the primary closure 31, 32, 33 over the entire surface or without recesses. Alternatively, by means of the supplementary element 10, surface structures of the cap element 31 and/or the Luer adapter 32, which are important for the application, can remain uncovered. This may, for example, concern grip grooves of the primary closure 31, 32, 33, which serve to improve the grip when opening the syringe (see FIGS. 29 and 30). In addition, it is also possible for the supplementary element 10 to have structures on an outer surface 14 which facilitate handling. For example, a grip structure 16 with grip grooves can be provided on an outer surface (see FIG. 6).

In addition to a purely mechanical fastening of the supplementary element 10 to the primary closure 31, 32 or 33, an alternative or additional fastening by means of adhesive or, in the case of thermoplastics, by means of welding, for example by ultrasonic welding, is also possible. If the supplementary element 10 is coupled to the primary closure 31, 32 or 33 by means of adhesive and/or welding, mechanical interlocking at the inner surface 13 of the supplementary element 10 with the outer surface 311, 321 or 331 of the cap element 31 and/or of the Luer adapter 32 or of the needle protection cap 33 can be saved. Preferably, the attachment of the supplementary element 10 to the primary closure 31, 32, 33 is such that a transmission of force in the rotational direction perpendicular as well as parallel to the longitudinal axis L of the syringe 30 is possible. This ensures, for example, that the supplementary element 10 can be rotated and removed together with the cap element 31 or the needle protection cap 33 to open the syringe 30.

The supplementary element 10 may, for example, be provided with one or more holes or recesses 18 to allow media to flow through once attached to the syringe 30 (see FIGS. 15-18 and 21-24). This is particularly important if the syringes 30 are to be sterilized. For example, ETO gas could pass through the openings from the outside to the inside so that sterilization is not impaired. On the other hand, the recesses 18 can also be used for drying if, for example, moisture has penetrated between the syringe 30 and the supplementary element 10 during steam sterilization.

The supplementary element 10 can be made in two parts and have a first part element 11 and a second part element 12 (see FIGS. 32-35). According to such an embodiment, it is advantageous if, for example, the first part element 11 is attached in the region of the head part or cap element 31 and the second part element 12 is attached in the region of the threaded part or Luer adapter 32. The two part elements 11 and 12 can form separate elements and have a separation area 17 (see FIGS. 34-35). The two part elements 11 and 12 can be connected to each other by means of the RFID functional unit 20, which is designed, for example, in the form of an RFID label and which has a separation area 23 and is specifically weakened by a perforation 24. Alternatively or additionally, the separation area 17 can also be designed as a severing area, in that the two part elements 11 and 12 are connected to each other, for example, by means of retaining or connecting webs 171 (see FIGS. 32-33).

The perforation 24 realizes a separation element and can be placed in an intermediate area between the upper, first part element 11 of the supplementary element 10, which is attached to the cap element 31, and the lower, second part element 12 of the supplementary element 10, which is attached to the Luer adapter 32. Alternatively, a severing element may be located in an adjacent region of the two part elements 11 and 12 of the supplementary element 10. According to such an embodiment and positioning of the RFID functional unit 20 in the form of an adhesive RFID label, the latter is preferably non-adhesive in a region of the perforation 24 and/or of the connecting webs 171 and of a separation gap between the two part elements 11, 12 of the supplementary element 10, in order to facilitate the removal of the cap element 31 during opening.

Figure 33:
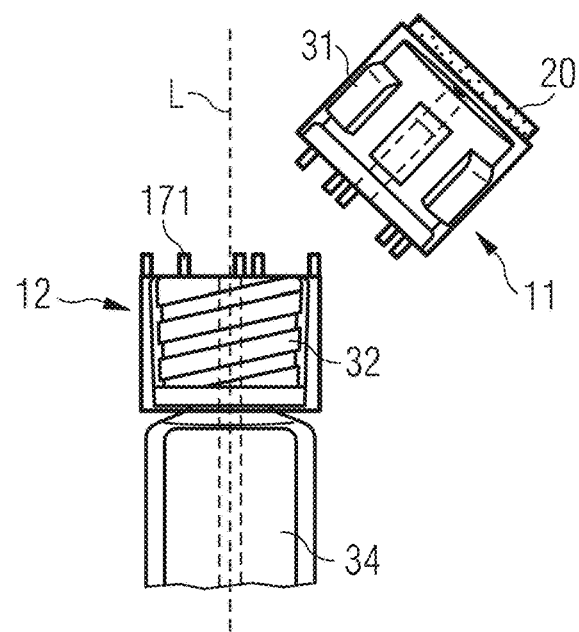
Figure 34:
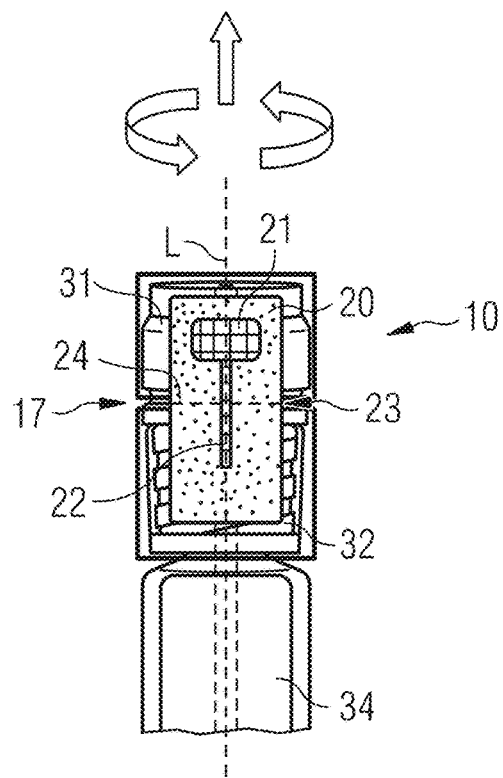
Figure 35:
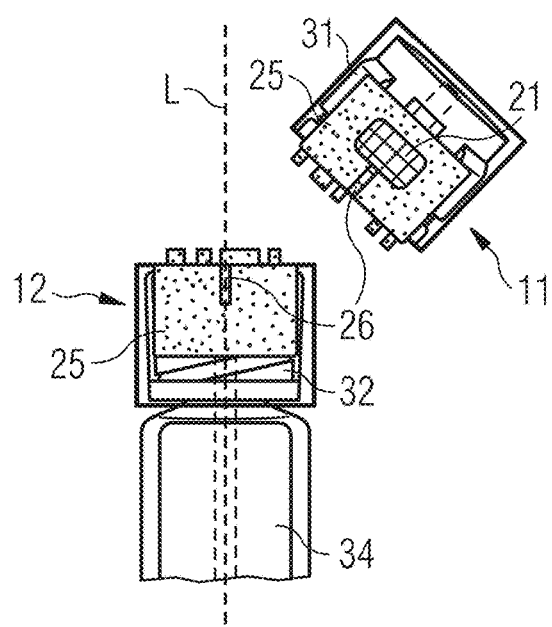
Figure 36:
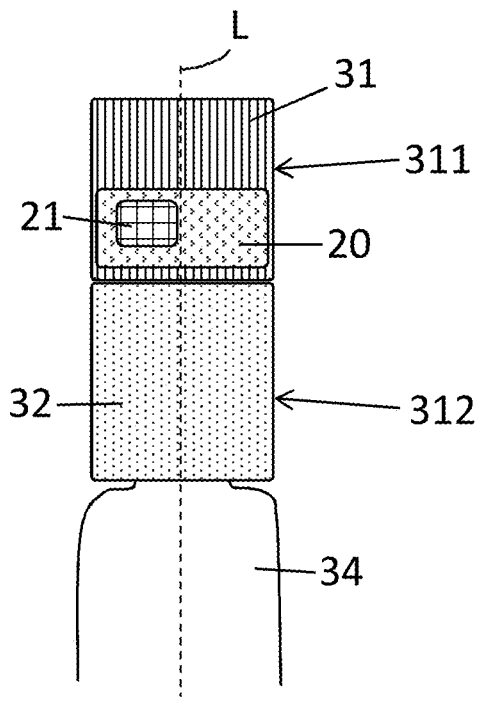

When the Luer-lock syringe 30 is opened, the connecting webs 171 and/or the RFID label 20 are destroyed and the cap element 31 can be removed from the Luer-lock syringe 30 together with the first part element 11 of the supplementary element 10 (see FIGS. 33 and 35). The broken connecting webs 171 and/or the RFID label 20 torn along the perforation 24 can then serve as an opening detection element, which recognizably indicates that the Luer-lock syringe 30 has been opened.

Alternatively or additionally, an electronic opening detection element in the form of an electrical conductor track 22 may be provided. The conductor track 22 is preferably placed over a cut-through line of the RFID label 20 and is formed, for example, by printing a conductive paste or as part of an etched antenna structure 27 of the RFID functional unit 20 (see FIG. 34). The conductive track 22 may be connected to the RFID chip 21 of the RFID functional unit 20. When the syringe 30 is opened, the conductor track 22 is destroyed (see FIG. 35) and conductor track sections 26 remain on the elements separated from each other. Such a destruction of the specifically arranged conductor track 22 can be registered by the RFID chip 21 as a detuning of the antenna structure 27 or as a clear change of a reading range. Thus, as an alternative or in addition to mechanical versions of an opening indicator, an electronic initial opening indicator and tamper protection can be realized by means of the labelling assembly 1.

The supplementary element 10 can in particular be designed in such a way that a region of the primary closure 31, 32, 33 to which the supplementary element 10 is applied has the same diameter or the same circumference as the syringe body 34 after application. The supplementary element 10 can thus provide a specific geometry compensation, so that it is advantageously possible to apply a label which adheres to both the supplementary element 10 and the syringe body 34 (see FIG. 8). In this way, for example, the supplementary element 10 can be additionally attached to the syringe 30 and undesired rotation of the Luer adapter 32, for example when opening the syringe 30 or when inserting a syringe needle, can be specifically counteracted.

Figure 9:
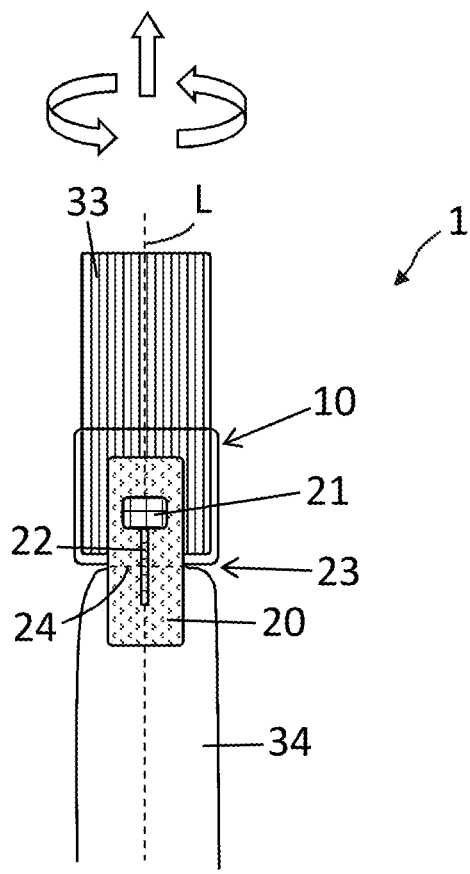
Figure 10:
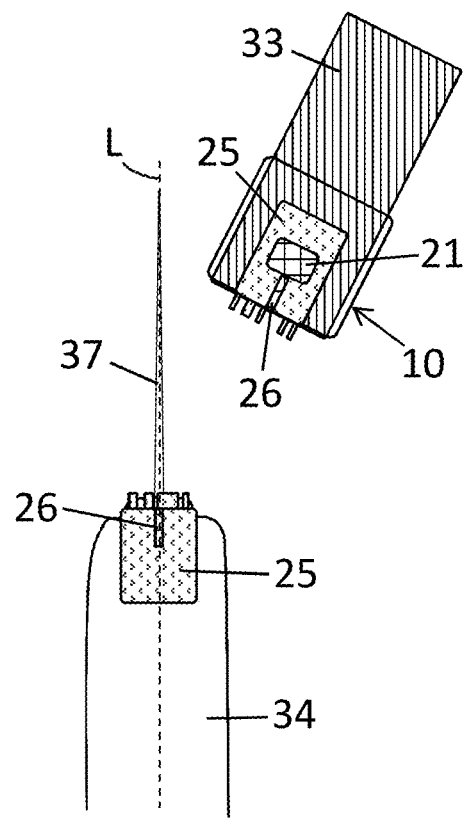

In the case of syringes 30 with a secured syringe needle, so-called "staked in needle" syringes, it is particularly useful to connect the supplementary element 10, which is attached to the needle protection cap 33, to the syringe body 34 in order to integrate a first-opening indicator (see FIGS. 9-10). In a separation region between the supplementary element 10 and the syringe body 34, a perforation 24 may be selectively introduced into the RFID tag 20, analogous to the previous embodiments, to weaken the RFID label 20 and to form the separation region 23 in a predetermined manner so as to facilitate opening and removal of the needle protection cap 33 together with the supplementary element 10.

The perforation 24 may also be placed in the needle-secured syringe 30 in an intermediate region between the supplementary element 10 and the syringe body 34 or in an adjacent region of the supplementary element 10 or the syringe body 34, wherein according to one embodiment of an adhesive RFID label 20, such a functional carrier is preferably non-adhesively formed in the region between the perforation 24 and a separation gap between the supplementary element 10 and the syringe body 34, so as to facilitate removal of the needle protection cap 33 upon opening.

It is also possible, analogous to the previous descriptions with respect to a Luer-lock syringe 30, to place an electrical conductor track 22 over a cut-through line of the RFID label 20 (see FIG. 9). When the syringe 30 is opened by pulling off and/or twisting off the protective needle cap 33, the conductor track 22 is destroyed, which can be detected by sensors using the RFID chip 21, stored and made available for reading (see FIG. 10).

Figure 4:
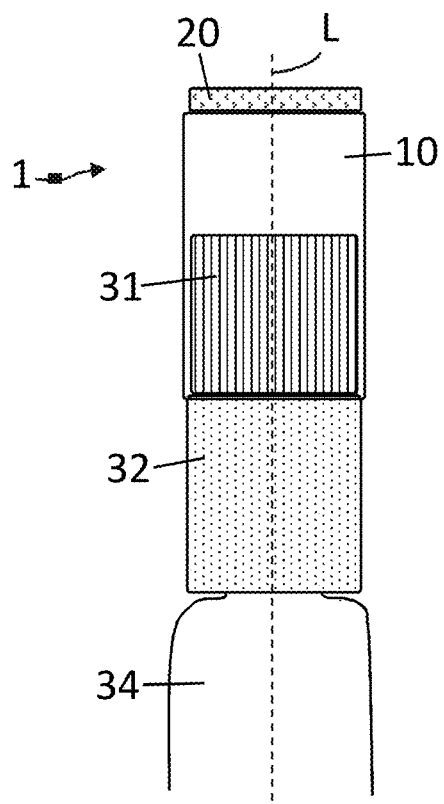
Figure 5:
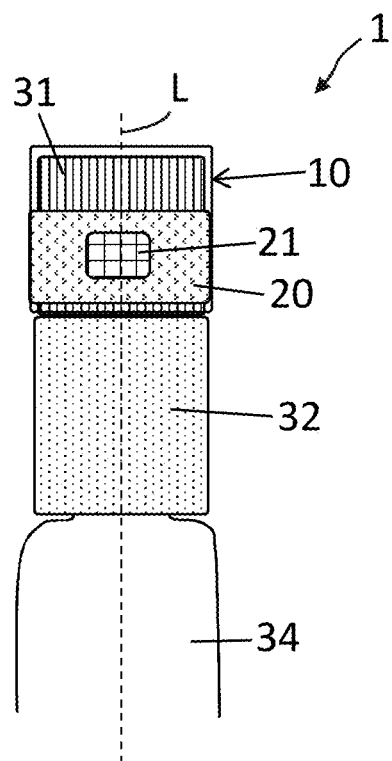
Figure 6:
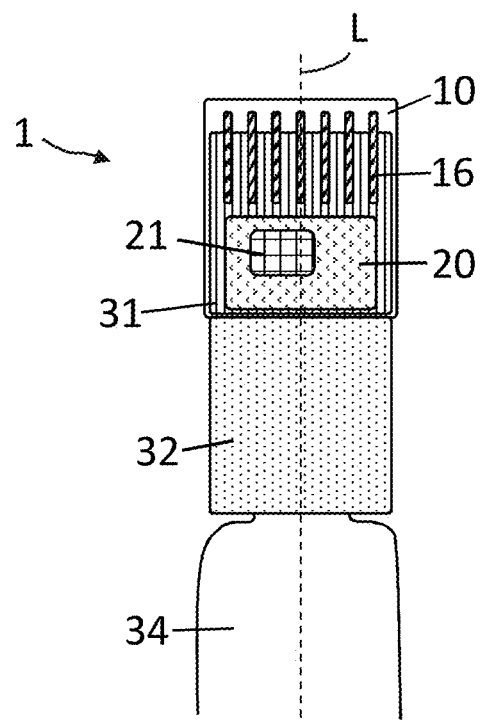
Figure 7:
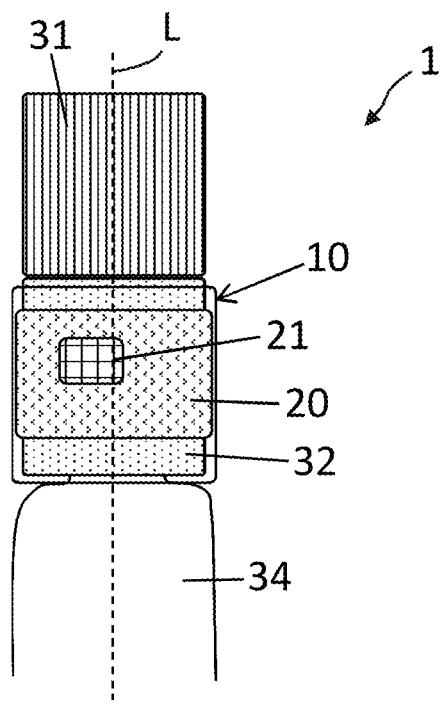
Figure 8:
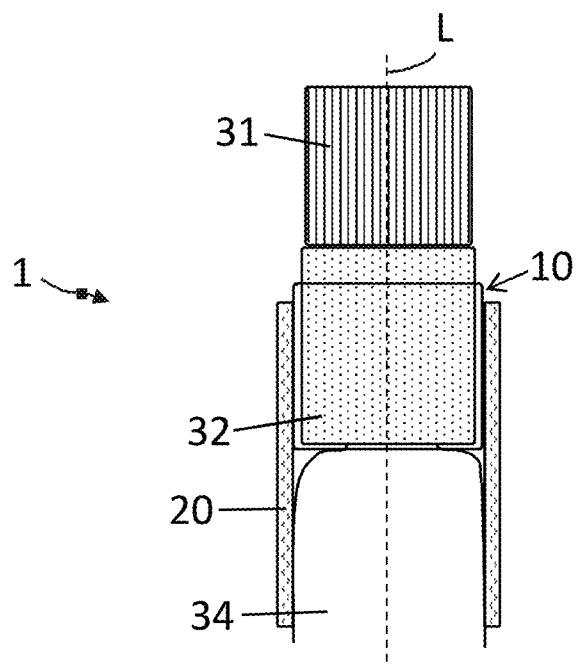

The supplementary element 10 can also be designed in such a way that it enlarges the syringe 30 in one or more dimensions and thus, for example, selectively increases the syringe length (see FIG. 4). This makes it possible, for example, for the RFID tag 20 applied to the supplementary element 10 to be located closer to a bottom of a syringe tub in which a plurality of syringes 30 can be housed upside down, and thereby be more reliably detected by readers that are intended to read the RFID chips 21 from a bottom side of the syringe tub.

The supplementary element 10 may further be formed with a predetermined surface structure on the outer surface 14 which is optimized or adapted for the application of the RFID functional unit 20. This can be achieved, for example, by a sufficiently large and suitably shaped plane surface of the supplementary element 10. The RFID functional unit 20 can be applied as an RFID tag or RFID label by means of pressure-sensitive adhesive to such a predetermined shaped surface, whereby it is advantageous if a material of the supplementary element 10 has a surface tension suitable for the adhesion of a pressure-sensitive adhesive and/or the outer surface 14 has a microstructure suitable for the adhesion of a pressure-sensitive adhesive.

Figure 11:
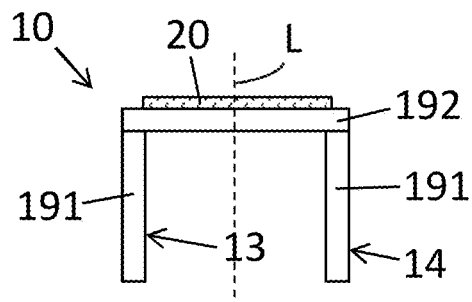
Figure 12:
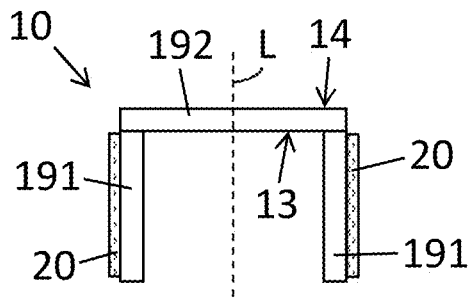
Figure 13:
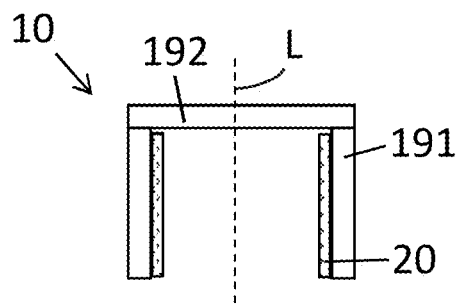
Figure 14:
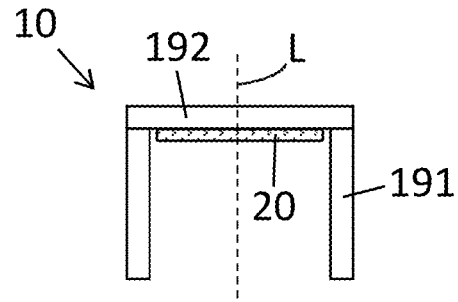
Figure 15:
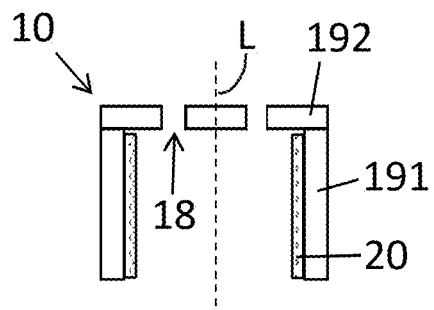
Figure 16:
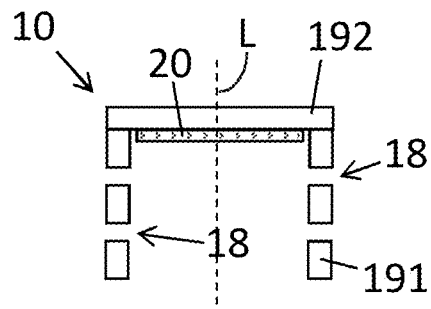
Figure 17:
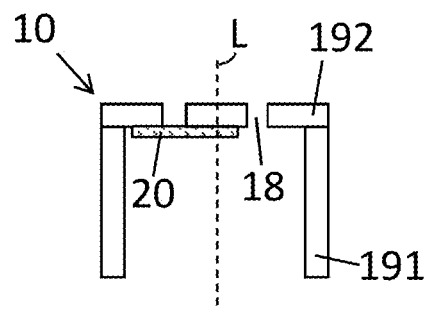
Figure 18:
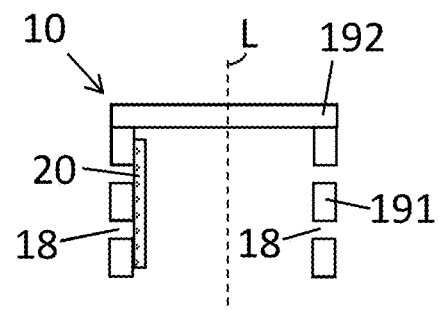
Figure 19:
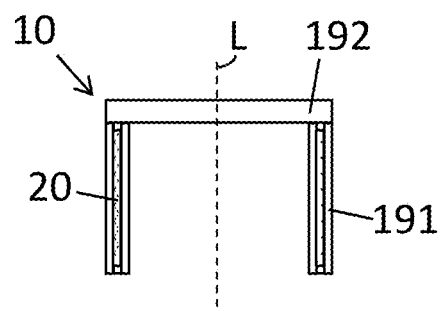
Figure 20:
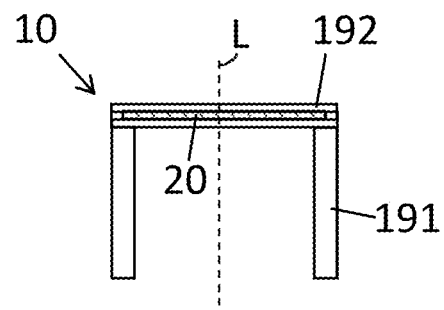
Figure 21:
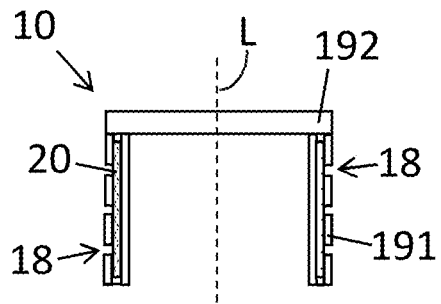
Figure 22:
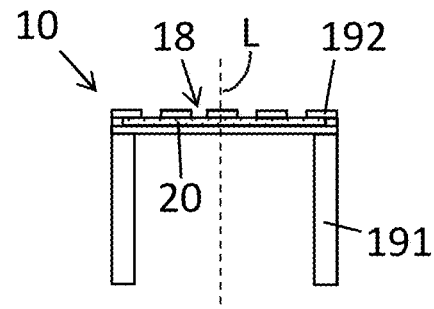
Figure 23:
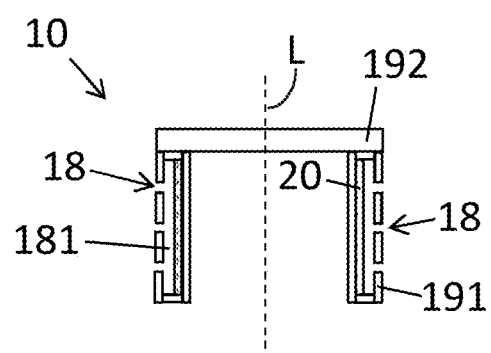
Figure 24:
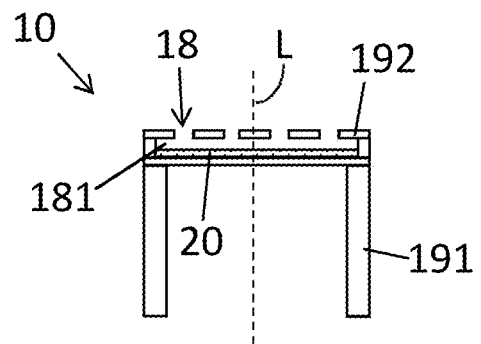
Figure 25:
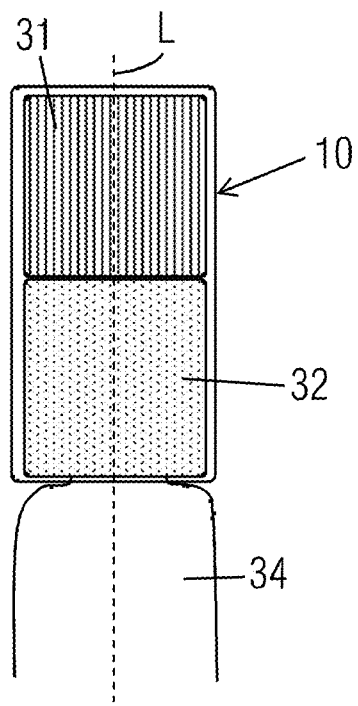

The RFID tag 20 may be applied to the outer surface 14 on the side wall 191 and/or the top or end wall 192 of the supplementary element 10 (see FIGS. 11-12). Alternatively, the RFID tag 20 may be applied to the inner surface 13 on the side wall 191 or the end wall 192 of the supplementary element 10 so that the RFID tag 20 is protected from environmental influences between the supplementary element 10 and the primary closure 31, 32 or 33 after the supplementary element 10 is attached to the syringe 30 (see FIGS. 13-14).

According to a further embodiment, the supplementary element 10 may have a multilayer structure such that the RFID tag 20 is accommodated in an intermediate layer of the supplementary element 10 (see FIGS. 19-24). Such an intermediate layer space can be formed as a cavity 181 in order to provide sufficient space for the RFID tag 20, in particular the RFID chip 21. Individual layers of the supplementary element 10 may be mechanically connected to each other, for example by click connections. Alternatively or additionally, individual layers of the supplementary element 10 may be joined together by means of an adhesive and/or welding, for example by means of ultrasonic welding.

By being accommodated in such an intermediate layer, the RFID tag 20 is particularly reliably protected from environmental influences. If it is desired that the RFID tag 20 is accessible from the outside by media, for example in connection with sterilization by means of ETO gas or steam, this can be arranged by means of the recesses 18 in the side wall 191, the end wall 192 or an outer layer of a multilayer supplementary element 10 (see FIGS. 15-18 and 21-24). It may be beneficial to make the cavity 181 in intermediate layers of the supplementary element 10 sufficiently large so that the medium for sterilization can distribute well in the cavity 181, thereby encompassing the RFID tag 20 and also penetrating under a pressure-sensitive adhesive (see FIGS. 23 and 24). Such recesses 18 then also serve, for example, for drying after sterilization by steam has taken place.

FIGS. 36 to 45 show embodiments of the labelling assembly 1 without a supplementary element. The RFID functional unit 20 and the primary closures 31, 32 and 33 to be coupled thereto can also be designed to match and be coupled to each other without a supplementary element. The RFID tag or label 20 may also be referred to as an RFID functional carrier and may be arranged directly on the end structures 31, 32 or 33 of the syringes 30. For example, it may be placed only on the cap element 31 or only on the Luer adapter 32 of the Luer-lock syringe 30 (see FIGS. 36 and 37).

Figure 39:
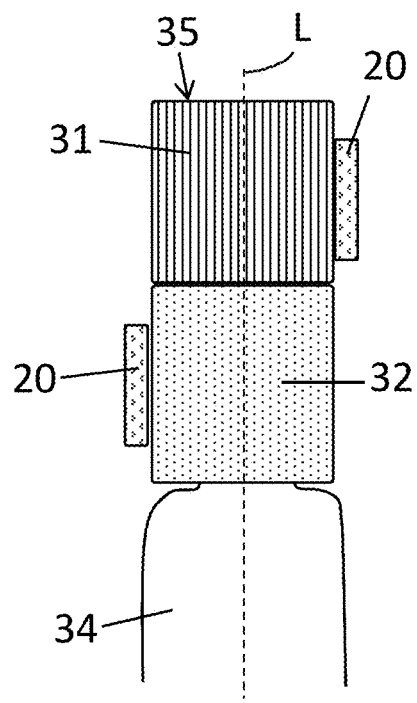
Figure 40:
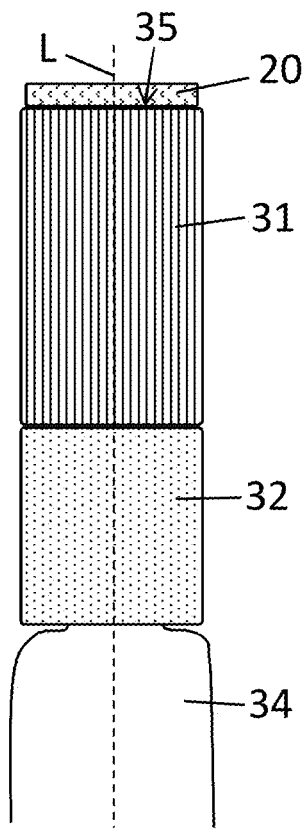
Figure 41:
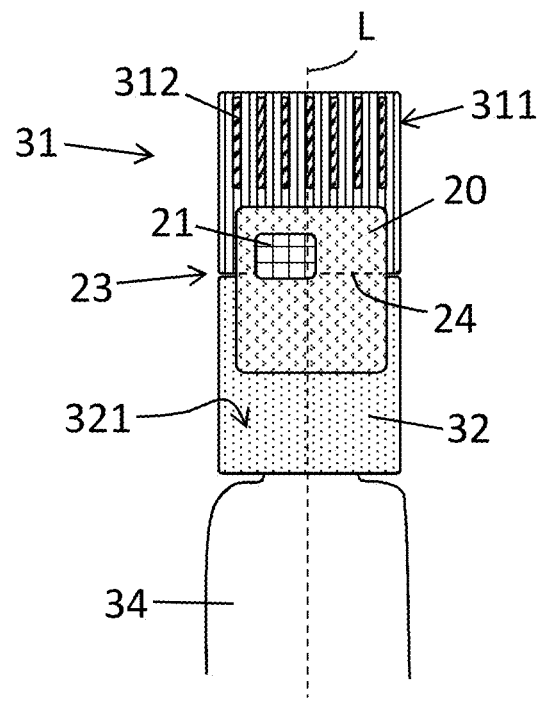
Figure 42:
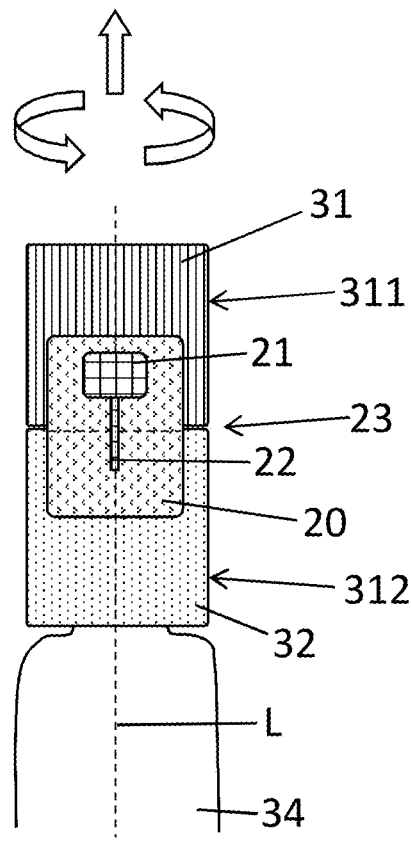
Figure 43:
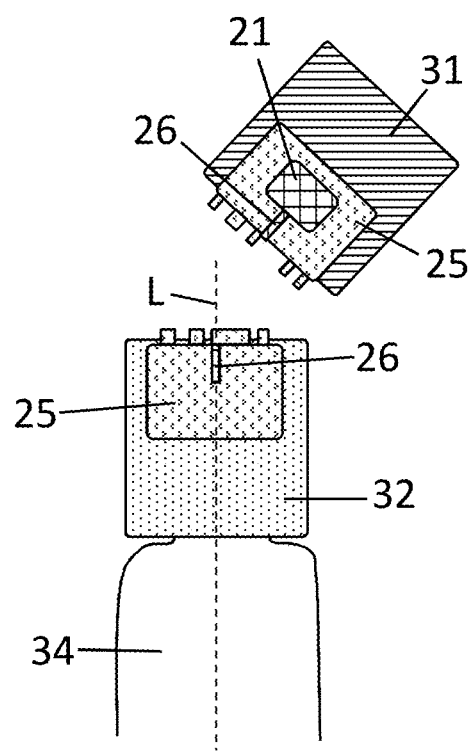
Figure 44:
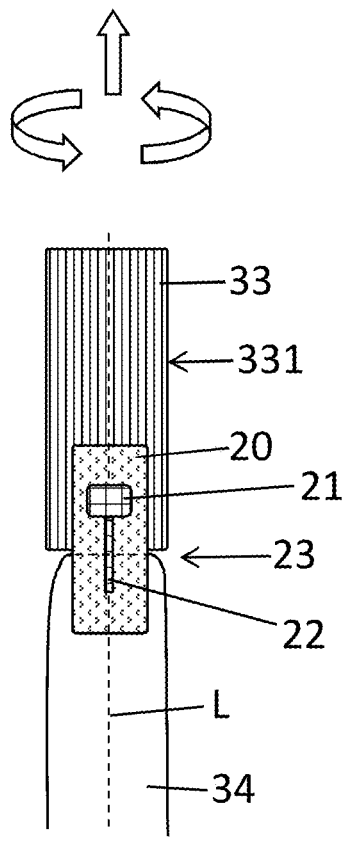
Figure 45:
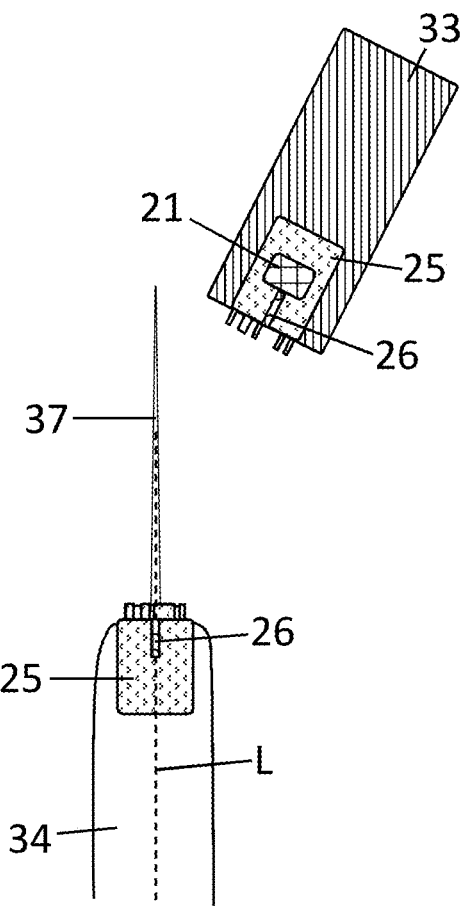

Alternatively, the RFID label 20 may be placed on the cap element 31 and on the Luer adapter 32 at the same time (see FIG. 39). It is also possible to place the RFID functional carrier 20 on the primary cap 31, 32 or 33 and simultaneously on the syringe body 34 of the respective syringe 30. This can be particularly useful for needle-locked syringes 30 where there is no Luer adapter (see FIGS. 44 and 45).

According to the embodiments in which the RFID functional carrier 20 is not to be placed exclusively on the primary closure 31, 32 or 33, the opening of the syringe 30 may be indicated by a tearing of the RFID functional carrier 20. The perforation 24 in the separation area 23 of the RFID functional carrier 20 may facilitate the tearing and an opening of the syringe 30. If there is an electrical conductor track 22 in the separation area of the RFID functional carrier 20, it will be destroyed during opening and track sections 26 will remain on the syringe body 34 or the Luer adapter 32 or on the needle protection cap 33 or the cap element 31 (see FIGS. 42-45). Such a severing of the conductor track 22 can be read out by the RFID chip 21 by means of sensors, for example as a detuning of the antenna structure 27 or due to a significant change in the read range.

Analogous to the described possibility of forming the surface structure of the supplementary element 10 in a predetermined manner, it is advantageous if, in a design of the labelling assembly 1 without a supplementary element, the surfaces 311, 321 and/or 331 of the end structures 31, 32, 33 of the syringes 30 for applying the RFID function unit 20 are formed in a predetermined manner. The surfaces 311, 321 or 331 can be smooth and with as little conicity as possible in the area which is intended for the application of the RFID function carrier 20. It is also useful to make the area sufficiently large.

Furthermore, a microstructure and a surface texture of a plastic material for forming the primary closures 31, 32 and/or 33 can be selected such that they are optimized or adapted for adhesion by means of an adhesive, in particular a pressure-sensitive adhesive.

Areas of the primary closures 31, 32 and/or 33 which are not intended for the application of the RFID function carrier 20 can be designed in such a way that they are advantageous for handling the syringe 30. For example, in such an area of the primary closure 31, 32 and/or 33, gripping grooves 312 may be formed to facilitate opening of the syringe 30 by a user (see FIG. 41).

Figure 37:
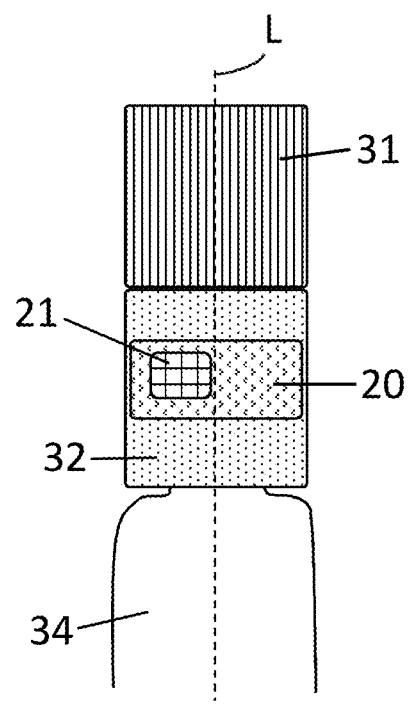
Figure 38:
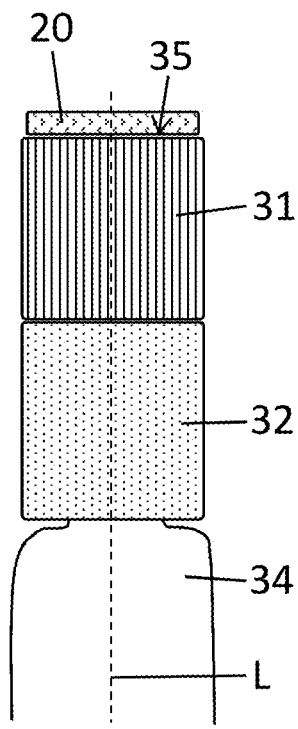

The RFID function carrier 20 can be placed either only on the cap element 31 (see FIGS. 36, 38 and 40) or only on the Luer adapter 32 of a Luer lock syringe 30 (see FIG. 37). In the case of the primary closure 31, 32, this is possible both on the outer surface 311, 321 on a respective side surface and on a top surface 35 of the cap element 31 (see FIGS. 36-40).

Alternatively, the RFID functional carrier 20 may be attached to both the cap element 31 and the Luer adapter 32 (see FIGS. 39 and 41-43). According to such an embodiment, it is advantageous that the cap element 31 and the Luer adapter 32 are formed in the area intended for the application of the RFID functional carrier 20 in such a way that a homogeneous surface is provided so that the RFID functional carrier 20 can be applied without interference, in particular without edge or step formation.

In addition, the RFID label 20 may have the perforation area 23, as previously described, in which it is predeterminedly weakened with the perforation 24 (see FIGS.

41-45). The perforation 24 may be placed in an intermediate region between the cap member 31 and the Luer adapter 32, or in an adjacent region of the cap member 31 or the Luer adapter 32, as a severing element to facilitate severing of the RFID functional carrier 20. According to such an embodiment, the RFID label 20 is preferably non-adhesive in the region of the perforation 24 and the separation gap between the cap element 31 and the Luer adapter 32 to facilitate removal of the cap element 31 upon opening. Similarly, for a needle-secured syringe 30, the perforation 24 may be located in an intermediate region between the needle cap 33 and the syringe body 34 or in an adjacent region of one of these elements (see FIGS. 44 and 45).

Furthermore, as previously described in relation to a supplementary element 10, the RFID functional carrier 20 may be configured such that an electrical conductor track 22 extends across a separation region between the cap element 31 and the Luer adapter 32. The conductor track 22 is formed, for example, by printing a conductive paste or as a component of an etched antenna, and is connected to the RFID chip 21 (see FIGS. 42-45). When the syringe 30 is opened, the conductor track 22 is destroyed, which can be read by means of the RFID chip 21 sensorically as a detuning of the antenna or by a strong change in the reading range of the RFID functional unit 20. Thus, an electronic first-opening indication can also be implemented in a labelling assembly 1 without a supplementary element.

Furthermore, the elements 31, 32 and/or 33 of the primary closure can be formed circumferentially identical to the syringe body 34. According to such an embodiment, the RFID functional carrier 20 can be arranged without folding up to the syringe body 34. This can be advantageous, for example, in needle-secured syringes 30 with a "staked in needle" in order to integrate an electronic first-opening indicator (see FIGS. 44-45).

Thus, the RFID functional unit 20 and the end structures 31, 32 and/or 33 can be designed in coordination with each other so that dimensions and/or surface properties are predefined changed compared to commercially available embodiments. In particular, for example, the cap element 31 of the primary closure for the Luer-lock syringe 30 can be made particularly long, in order, for example, to arrange the RFID function carrier 20 as close as possible to a base of the syringe tub in the case of syringes 30 nested in syringe nests, in order to facilitate reading of the RFID function unit 20 (see FIG. 40).

The described designs of the electronic labelling assembly 1 concentrate on RFID functionalization in the area of the closure structures of syringes 30, which can extend in particular only in the area of the supplementary element 10 and/or the primary closures 31, 32 and 33. It is therefore not necessary to combine RFID functionalization with the same labelling of the syringe body 34. By combining this with the supplementary element 10, which is connected to an RFID functional unit 20, a closure area of the respective syringe can be electronically functionalized without having to modify the syringe 30 itself in this respect.

FIGS. 46 and 47 show schematic illustrations of embodiments of the antenna structure 27 of the RFID functional unit 20. The antenna structure 27 has a predetermined length LA and a predetermined width BA, which are predeterminedly formed in particular in coordination with a perimeter of the supplementary element 10 at the outer surface 14 and/or an end wall surface of the supplementary element 10 at the end wall 192. Alternatively, the length LA and the width BA of the antenna structure 27 are predefined in coordination with a perimeter of the primary closure 31, 32 or 33 at the associated outer surface 311, 321 or 331 and/or an end wall surface, in particular of the cap element 31.

Referring to FIG. 46, the antenna structure 27 has a simple rectangular loop shape wrapped around the supplementary element 10 and/or the primary closure 31, 32 or 33. The illustrated direction of expansion of the width BA would then preferably be oriented in the direction of the longitudinal axis L, so that the length LA, for example, corresponds approximately to the circumference that the supplementary element 10 and/or the primary closure 31, 32 or 33 has on a respective outer side. In relation to a commercially available Luer-lock syringe, the antenna structure 27 therefore has, for example, a length LA of at least 20 mm and a width BA of at least 2 mm.

FIG. 47 illustrates a further embodiment of the antenna structure 27, which is circular and meander-shaped and realizes an intertwined or nested loop shape. Such a circular antenna shape is formed, for example, in a coordinated manner with respect to the end wall 192 of the supplementary element 10 or the upper surface 35 of the cap element 31. Furthermore, both illustrated embodiments of the antenna structure 27 according to FIGS. 46 and 47 may be arranged on a side surface and/or an upper surface of the supplementary element 10 and/or the primary cap 31, 32 or 33. Furthermore, it is possible to provide more than one RFID functional unit 20 on a syringe 30, so that, for example, one embodiment of the RFID functional unit 20 is arranged or integrated on a side surface and on a top surface respectively.

FIG. 48 shows a radiation pattern that can be set up with the antenna structure 27 according to FIG. 46 when the RFID functional unit 20 is wrapped around an outer surface 14 or 311, 321 or 331. Such an arrangement leads to advantageous radiation characteristics due to the magnetic field distributions, which are mainly oriented in the axial direction or in the direction of the illustrated longitudinal axis L, respectively. The radiation characteristic can be described as donut-shaped, with the donut hole or minima of the radiation being oriented transversely to the longitudinal axis L. FIG. 48 shows a section through the center of such a vertically aligned donut. Due to the radiation properties of the antenna structure 27 of the RFID functional unit 20 directed in this way, very advantageous reading ranges of up to 40 cm can be achieved with a small size.

A method for applying or attaching an embodiment of the labelling assembly 1 can be carried out according to the flow chart in FIG. 49 as follows: In a step S1, the required components of the labelling assembly 1 and the elements of the primary closure 31 and/or 32 or 33 to be coupled thereto are provided with predetermined, coordinated properties. In the following, the labelling assembly 1 is discussed, which comprises an embodiment of the supplementary element 10.

In a step S2, the coupling of the RFID functional unit 20 with the supplementary element 10 takes place.

In a step S3, coupling of the supplementary element 10 by means of the coupling structure, for example in the form of an coupling structure 15, to the outer surface 311 and/or 321 or 331 of the primary closure 31, 32 or 33 takes place so that the supplementary element 10 surrounds the primary closure 31 and/or 32 or 33 and attaches the RFID functional unit 20 to the primary closure 31 and/or 32 or 33.

In a further step S4, the syringe body 34 of the syringe 30 may further be provided. Then, in a step S5, coupling of the primary closure 31, 32 or 33 to the syringe body 34 is performed.

The coupling or application of the RIFD tag 20 to the supplementary element 10 can take place either before the supplementary element 10 or the primary closure 31, 32 or 33 is applied to the syringe 30 or afterwards.

By means of the labelling assembly 1 described, a simple, direct and reliable application of the RFID label 20 to a closure area of the syringe 30 is possible without the need for further aids. Furthermore, by means of the described labelling assembly 1 it is possible to achieve relevantly larger surfaces and areas for applying, attaching or inserting the RFID functionality even without disturbing enlargement of syringe dimensions, whereby larger RFID antenna structures can be used and thereby in turn a greater reading range can be achieved even with small primary closures 31, 32 and 33.

In numerous embodiments of the labelling assembly 1 it is possible to apply the supplementary element 10 electronically functionalized with the RFID functional unit 20 to the end structures 31, 32 or 33 of the syringes 30 before they are fixed to the syringe 30 or syringe body 34. An impairment of a syringe needle 37 or a tightness of the syringe 30 by the application of the RFID functional unit 20 or the supplementary element 10 can thus be prevented.

The described embodiments of the labelling assembly 1 include the possibility of predefined modification of the dimensions of the syringe 30, for example by attaching a supplementary element 10 of purposefully elongated design, whereby a distance of the RFID chip 21 from a reader can be reduced and reliable reading can thus be simplified. Accordingly, the RFID functional unit 20 is arranged further away from the syringe body 34 in a predetermined manner. In addition, the RFID tag 20 can be specifically designed for application to the limited areas available at the end structures 31, 32 or 33 of the syringes 30 in order to provide a sufficient read range despite a relatively small size for a respective application purpose. In particular, the labelling assembly 1 can be designed in such a way that the adapted syringes 30 do not apply too broadly and can still be nested or stored in syringe tubes provided for this purpose.

REFERENCE SIGNS 1 electronic labelling assembly
10 supplementary element
11 first part element of the supplementary element
12 second part element of the supplementary element
13 inner surface of the supplementary element
14 outer surface of the supplementary element
15 coupling structure of the supplementary element
151 horizontal interlocking element of the interlocking structure
152 vertical interlocking element of the interlocking structure
153 engaging hook of the interlocking structure
16 grip structure of the supplementary element
17 separation area of the supplementary element
171 retaining webs/connecting webs of the supplementary element
18 recess of the supplementary element
181 cavity of the supplementary element
191 side wall of supplementary element
192 end wall of the supplementary element
20 RFID functional unit/RFID functional carrier/RFID label
21 RFID chip
22 electrical conductor track
23 separation area
24 perforation
25 label section
26 conductor track section
27 antenna structure
30 Luer-lock syringe/needle-secured syringe
31 cap element/head part of Luer-lock syringe
311 outer surface of cap element
312 grip structure of the cap element
32 Luer adapter/threaded part of the Luer-lock syringe
321 outer surface of the Luer adapter
33 needle protection cap
331 outer surface of needle protection cap
34 container body/syringe body
35 top surface of cap element
36 syringe plunger
37 syringe needle
BA width of the antenna structure
LA length of the antenna structure
L longitudinal axis of the syringe/supplementary element
S(i) step of a method for applying an electronic labelling assembly

The invention claimed is:

1. An electronic labelling assembly for a multi-part container, comprising:
a sleeve-shaped supplementary element which includes a coupling structure and which is configured to be coupled, with respect to a longitudinal axis of the supplementary element, by means of the coupling structure to an outer surface of a primary closure for the container and to surround the primary closure, and
an RFID functional unit comprising an RFID chip and an antenna structure coupled thereto, the supplementary element and the RFID functional unit being formed in coordination with each other and coupled to each other so that the RFID functional unit is attachable to the primary closure of the container by means of the supplementary element,
wherein, with respect to the longitudinal axis, the supplementary element has, on an inner surface, a circumferential contour which forms a negative shape with respect to a circumferential contour on a respective outer surface of the primary closure, and
wherein the supplementary element covers the outer surface of the primary closure only partly along the longitudinal axis and surrounds only an upper section of the primary closure.

2. The labelling assembly according to claim 1, wherein the coupling structure comprises, with respect to the longitudinal axis of the supplementary element, on an inner surface, an interlocking structure with one or more horizontal and/or vertical interlocking elements which are predefined in coordination with the outer surface of the primary closure.

3. The labelling assembly according to claim 2, wherein the interlocking structure has a toothed element in the form of engaging hook which is arranged to form a positive coupling with the primary closure of the container, so that with respect to the longitudinal axis a holding force can be set up in the direction of the longitudinal axis between the supplementary element and the primary closure.

4. The labelling assembly according to claim 1, wherein the supplementary element comprises, with respect to the longitudinal axis, a first part element, a second part element and a separation area formed therebetween, so that, when the container applied with the labelling assembly is opened, the supplementary element is separable in the separation area and the first part element together with a part of the primary closure is removable from the second part element and a container body of the container.

5. The labelling assembly according to claim 4, wherein the first and the second part elements are connected to one another by means of connecting webs, so that, when the container applied with the labelling assembly is opened, the supplementary element can be cut through in a predetermined manner in the separation area and the first part element can be removed from the second part element by breaking open the connecting webs.

6. The labelling assembly according to claim 4, wherein the separation area is formed in coordination with the container in an area of the supplementary element which, in an applied state of the labelling assembly on the container, is associated with a transition between a head part and an adjacent part of the container.

7. The labelling assembly according to claim 1, wherein the supplementary element comprises a recess extending into or through a wall of the supplementary element and providing a channel for fluid exchange between an interior and an exterior of the supplementary element.

8. The labelling assembly according to claim 1, wherein the supplementary element comprises a side wall and an end wall with respect to the longitudinal axis, and the RFID functional unit is arranged on or in the side wall or the end wall.

9. The labelling assembly according to claim 1, wherein the RFID functional unit is embedded in the supplementary element and/or arranged on an inner surface of the supplementary element with respect to the longitudinal axis, so that the RFID functional unit is arranged between an outer surface of the supplementary element and the primary closure of the container when the labelling assembly is applied on the container.

10. The labelling assembly according to claim 1, wherein the RFID functional unit comprises a carrier element or a label by means of which the RFID functional unit is arranged on the supplementary element.

11. The labelling assembly according to claim 1, wherein the RFID functional unit comprises a label and a reusable adhesive layer, by means of which the label can be attached to the supplementary element and can be detached again at least in sections.

12. The labelling assembly according to claim 1, wherein the RFID functional unit is formed as a multilayer RFID label and has at least one section which can be folded open and folded in again, so that a label flag can be formed which protrudes from the remaining RFID label.

13. The labelling assembly according to claim 1, comprising:
an opening detection element, which is arranged in a separation area of the supplementary element and/or of the RFID functional unit and which is configured to indicate an opening of the container applied with the labelling assembly by means of removing at least one partial element of the supplementary element and/or of the RFID functional unit from the container.

14. The labelling assembly according to claim 13, wherein a respective removable sub-element is formed as a part element of the supplementary element and/or as a label section and/or as a conductor track section of the RFID functional unit.

15. The labelling assembly according to claim 1, wherein the supplementary element and the RFID functional unit are configured and coupled in coordination with one another in such a way that, in an applied state of the labelling assembly on the container, the RFID functional unit extends only in the region of the supplementary element and of the primary closure of the container.

16. The labelling assembly according to claim 1, wherein a length and a width of the antenna structure of the RFID functional unit and a circumference of the supplementary element on an outer surface and/or an end wall surface of the supplementary element on an end wall are formed in coordination with one another with respect to the longitudinal axis.

17. The labelling assembly according to claim 1, wherein the antenna structure of the RFID functional unit has a rectangular shape with a length of at least 20 mm and a width of at least 2 mm relative to the longitudinal axis.

18. The labelling assembly according to claim 1, wherein the antenna structure of the RFID functional unit is circular and meander-shaped.

19. A system, comprising:
the primary closure which can be coupled to a container body of a container which can be divided into a plurality of parts, and
the electronic labelling assembly according to claim 1, which is coupled to the primary closure such that the supplementary element attaches the RFID functional unit to the primary closure and the supplementary element surrounds the primary closure at least in sections.

20. The system according to claim 19, comprising:
a container body coupled to the primary closure, wherein the system forms a Luer-lock syringe or a needle-secured syringe, and wherein in the embodiment of a Luer-lock syringe a cap element and a Luer adapter and in the embodiment of a needle-secured syringe a needle protection cap form the respective primary closure.

21. A method of applying the electronic labelling assembly according to claim 1 to a primary closure for a multi-part container, comprising:
providing the primary closure for a container divisible into multiple parts, which is couplable to a container body of the container,
providing the sleeve-shaped supplementary element comprising a coupling structure, and, with respect to the longitudinal axis, on an inner surface, a circumferential contour which forms a negative shape with respect to a circumferential contour on a respective outer surface of the primary closure,
providing the RFID functional unit comprising an RFID chip and an antenna structure coupled thereto,
coupling the RFID functional unit to the supplementary element, and
coupling the supplementary element by means of the coupling structure to an outer surface of the primary closure so that the supplementary element surrounds the primary closure and the RFID functional unit is attached to the primary closure by means of the supplementary element such that the supplementary element covers the outer surface of the primary closure only partly along the longitudinal axis and surrounds only an upper section of the primary closure.

22. The method according to claim 21, comprising:
providing the container body of the container, and
coupling the primary closure to the container body.

23. The method of claim 22, wherein coupling the primary closure to the container body is performed subsequent to coupling the supplementary element and the RFID functional unit to the primary closure.

* * * * *